United States Patent
Jang et al.

(10) Patent No.: US 9,031,136 B2
(45) Date of Patent: May 12, 2015

(54) DEVICE AND METHOD FOR ENCODING/DECODING

(75) Inventors: Euee-Seon Jang, Seoul (KR); Hyun-Gyu Kim, Seoul (KR); Chung-Ku Lee, Incheon (KR)

(73) Assignee: Humax Holdings Co., Ltd., Yongin-si (KR)

( * ) Notice: Subject to any disclaimer, the term of this patent is extended or adjusted under 35 U.S.C. 154(b) by 401 days.

(21) Appl. No.: 13/202,552

(22) PCT Filed: Feb. 1, 2010

(86) PCT No.: PCT/KR2010/000605
§ 371 (c)(1),
(2), (4) Date: Aug. 19, 2011

(87) PCT Pub. No.: WO2010/095823
PCT Pub. Date: Aug. 26, 2010

(65) Prior Publication Data
US 2011/0299603 A1    Dec. 8, 2011

(30) Foreign Application Priority Data
Feb. 19, 2009    (KR) ................. 10-2009-0013814

(51) Int. Cl.
*H04N 7/12*     (2006.01)
*H04N 11/02*    (2006.01)
*H04N 21/435*   (2011.01)
*H04N 21/235*   (2011.01)
*H04N 21/81*    (2011.01)
*H04N 21/8543*  (2011.01)

(52) U.S. Cl.
CPC .......... *H04N 21/435* (2013.01); *H04N 21/235* (2013.01); *H04N 21/2353* (2013.01); *H04N 21/8193* (2013.01); *H04N 21/8543* (2013.01)

(58) Field of Classification Search
USPC ........................................... 375/240
See application file for complete search history.

(56) References Cited

U.S. PATENT DOCUMENTS

| 6,480,537 B1* | 11/2002 | Agrawal et al. ........... 375/240 |
| 7,403,564 B2* | 7/2008 | Laksono ................. 375/240.16 |
| 8,149,920 B2* | 4/2012 | Jang et al. ............. 375/240.24 |
| 2003/0195979 A1* | 10/2003 | Park .................... 709/231 |

(Continued)

FOREIGN PATENT DOCUMENTS

| KR | 10-0654601 B1 | 12/2006 |
| KR | 10-0705971 B1 | 4/2007 |

(Continued)

*Primary Examiner* — Gims Philippe
*Assistant Examiner* — Samuel D Fereja
(74) *Attorney, Agent, or Firm* — Birch, Stewart, Kolasch & Birch, LLP

(57) ABSTRACT

A device and a method for encoding/decoding are disclosed. The encoding apparatus includes: an encoding unit configured to encode data and generate encoded data; a decoder description generation unit configured to generate a decoder description that describes functional units (FUs) constituting a decoder for decoding the encoded data and the connection relation of the FUs; an FU list generation unit configured to generate and output an FU list for FUs constituting a decoder for decoding the encoded data; and a packetizing unit configured to be inputted with the encoded data, to be inputted with a decoder description, an FU list and FUs corresponding to the inputted encoded data, and to packetize and output said decoder description, FU list and FUs.

15 Claims, 27 Drawing Sheets

(56) References Cited

U.S. PATENT DOCUMENTS

| | | |
|---|---|---|
| 2004/0140916 A1* | 7/2004 | Ji .................................. 341/50 |
| 2005/0175098 A1* | 8/2005 | Narasimhan et al. .... 375/240.12 |
| 2005/0259688 A1* | 11/2005 | Gordon ........................ 370/477 |
| 2005/0281328 A1* | 12/2005 | Hurst et al. ................... 375/240 |
| 2006/0114136 A1* | 6/2006 | Chu et al. ...................... 341/52 |
| 2007/0046820 A1* | 3/2007 | Mead et al. ................... 348/571 |
| 2007/0081587 A1* | 4/2007 | Raveendran et al. ...... 375/240.1 |
| 2008/0037649 A1 | 2/2008 | Jang et al. |
| 2008/0304757 A1* | 12/2008 | Chen et al. ................... 382/232 |
| 2009/0003456 A1 | 1/2009 | Jang et al. |
| 2009/0074376 A1* | 3/2009 | Lin et al. ......................... 386/66 |
| 2009/0161767 A1* | 6/2009 | Jang et al. ................ 375/240.24 |

FOREIGN PATENT DOCUMENTS

| | | |
|---|---|---|
| KR | 10-2007-0075197 A | 7/2007 |
| KR | 10-0858244 B1 | 9/2008 |
| KR | 10-2009-0002508 A | 1/2009 |
| WO | WO 2007040297 A1 * | 4/2007 |
| WO | WO 2009005225 A1 * | 1/2009 |

* cited by examiner

FIG. 12

| Table Start Code | Table Code | Content | Table End Code |

FIG. 13

| FUID | VN name | Version | INPUT ports | OUTPUT ports | QID name |

| FUID flag (1bit) | FUID (8bits) |

| VN name Length (8bits) | VN name |

| INPUT port length (8bits) | INPUT port name | INPUT ports flag (1bit) |

| OUTPUT port length (8bits) | OUTPUT port name | OUTPUT ports flag (1bit) |

| QID name flag (1bit) | QID name length (8bits) | QID name |

FIG. 15

| Parameter name | Parent VNT index | ET index | TT index |
|---|---|---|---|

| Parameter name length (8bits) | Parameter name |
|---|---|

| Parent VNT flag (1bit) | Parent VNT index (8bits) |
|---|---|

| ET index flag (1bit) | ET index (8bits) |
|---|---|

| TT index flag (1bit) | TT index (8bits) |
|---|---|

FIG. 16

| Src FUIT index | Dst FUIT index | Src port name | Dst port name | Attribute name | Attribute value | ET Index |

| Src FUIT flag (1bit) |
| Dst FUIT flag (1bit) |

| Src FUIT index (8bits) |
| Dst FUIT index (8bits) |

| Src and Dst same flag (1bit) | Src port name length (8bits) | Src port name | Dst port name length (8bits) | Dst port name |

| Attribute name flag (1bit) | Attribute name length (8bits) | Attribute name |
| Attribute value flag (1bit) | Attribute value length (8bits) | Attribute value |

| ET index flag (1bit) | ET index (8bits) |

FIG. 17

| Kind | Literal kind | Literal value | Variable name | Operator | Child ET index | Args ET index |

Kind (3bits)

Literal kind flag (1bit) | Literal kind (3bits)

Literal value flag (1bit) | Literal value length (8bits) | Literal value

Variable name flag (1bit) | Variable name length (8bits) | Variable name

Operator flag (1bit) | Operator length (8bits) | Operator

Child ET index flag (1bit) | Child ET index (8bits) | Args ET index flag (1bit) | Args ET index (8bits)

FIG. 20

| TBN(4) | FU Number(28) |

DEVICE AND METHOD FOR ENCODING/DECODING

TECHNICAL FIELD

The present invention is related to encoding/decoding, more specifically to an apparatus for and a method of encoding/decoding video data through combination of functional units that perform unit decoding.

BACKGROUND ART

Video images are commonly transcoded to a bitstream form by an encoder. The bitstream is stored according to an encoding type that satisfies the conditions of the encoder.

MPEG requires syntax and semantics for the conditions of a bitstream.

Syntax refers to the structure or form and length of data, and indicates the order of expressing the data. In other words, syntax is for conforming to the grammar for encoding/decoding operations and defines the order, length and form of the data included in the bitstream.

Semantics indicates what each of the bits constituting the data means. That is, semantics shows the meaning of each element in the bitstream.

Therefore, various types of bitstreams can be generated according to the encoding conditions or applied standard (or codec) of the encoder. Generally, each standard (e.g., MPEG-1, MPEG-2, MPEG-4, MPEG-4 AVC, etc.) has different bitstream syntax.

Therefore, every bitstream that is encoded according to a different standard or encoding condition has different forms of syntax, semantics and decoding process, and it is required that a decoder corresponding to the encoder be used in order to decode the bitstream.

As described above, there has been a restriction in the conventional bitstream decoder to satisfy the conditions of the encoder, and this restriction has made it difficult to realize a unified decoder that could address multiple standards.

DISCLOSURE

Technical Problem

Contrived to solve the above problem, the present invention provides a method of and an apparatus for decoding a bitstream that can decode a bitstream that is encoded in various forms (syntax, semantics) according to different standards (e.g., MPEG-1, MPEG-2, MPEG-4, MPEG-4 AVC, etc.).

The present invention provides a method of and an apparatus for decoding a bitstream that can use functional units for decoding by efficiently distinguishing and identifying the functional units for decoding.

The present invention provides a method of and an apparatus for decoding a bitstream that can use functional units for decoding by storing and readily identifying based on their types.

The present invention provides a method of and an apparatus for encoding/decoding that generate an extended bitstream, in which a decoder description is added, or generate a bitstream and the decoder description independently so that a bitstream that is encoded in various formats (syntax, semantics) based on each standard can be decoded by a same information recognition method.

The present invention provides a method of and an apparatus for encoding/decoding in which bitstreams that are compressed in various encoding methods are parsed by a same information analysis method and the functional units for decoding are organically controlled by using the parsed data.

The present invention provides a method of and an apparatus for encoding/decoding in which bitstreams that are compressed in various encoding methods are parsed by a same information analysis method and the functional units for decoding are organically controlled by using the parsed data.

The present invention provides a method of and an apparatus for encoding/decoding that can commonly apply a syntax analyzing method for decoding various forms of bitstreams.

The present invention provides a method of and an apparatus for encoding/decoding that can apply a set of new commands for parsing various forms of bitstreams by a common syntax analyzing method.

The present invention provides a method of and an apparatus for encoding/decoding in which a decoder can readily decode a bitstream even when a syntax element is changed, added or deleted.

The present invention provides a method of and an apparatus for encoding/decoding in which element information (i.e., a result of syntax parsing) of analyzed syntax can be used by elements used for decoding a bitstream.

The present invention provides a method of and an apparatus for encoding/decoding in which element information of pre-analyzed syntax can be used for analyzing a following bitstream syntax element.

The present invention provides a method of and an apparatus for encoding/decoding in which functions included in various decoding processes suggested by different standards (codecs) are divided according to functional units and provided in a tool box.

The present invention provides a method of and an apparatus for encoding/decoding that can use necessary functional units selectively from the tool box in order to decode bitstreams that are encoded in various forms.

The present invention provides a method of and an apparatus for encoding/decoding that can readily change, add or delete functional units stored in the tool box.

The present invention provides a system for encoding/decoding that can use customized functional units that are defined by a user for encoding and decoding.

The present invention provides a system for encoding/decoding that can allow an encoding system to provide a functional unit to a decoding system in a broadcasting environment.

The present invention provides a system for encoding/decoding that can allow a decoding system to request to and receive from an encoding system a functional unit required for decoding the received data in a two-way broadcasting communication environment.

Technical Solution

Contrived to solve the above problems, an aspect of the present invention features an apparatus for and a method of encoding/decoding that can be universally used in various encoding formats.

An encoding apparatus in accordance with an embodiment of the present invention can include: an encoding unit configured to encode data and generate encoded data; a decoder description generation unit configured to generate a decoder description that describes functional units (FUs) constituting a decoder for decoding the encoded data and the connection relation of the FUs; an FU list generation unit configured to generate and output an FU list for FUs constituting a decoder for decoding the encoded data; and a packetizing unit configured to be inputted with the encoded data, to be inputted with a decoder description, an FU list and FUs corresponding to the inputted encoded data, and to packetize and output said decoder description, FU list and FUs.

The packetizing unit can be configured to respectively assign a peculiar ID to and packetize the encoded data, the decoder description, the FU list and the FUs and to generate an encoded data packet, a decoder description packet, an FU list packet and an FU packet.

The encoding apparatus can also include a bitstream generation unit configured to generate a bitstream in which the encoded data packet, the decoder description packet, the FU list packet and the FU packet are combined.

The FU list packet can include FU identification (FUID) of the pertinent FUs and packet ID of the pertinent FU packets.

The FUID can include a tool box number (TBN) field, which indicates a tool box to which the pertinent FU belongs, and an FU number field, which indicates peculiar identification of the pertinent FU.

A decoding apparatus in accordance with an embodiment of the present invention can include: a tool box configured to store a plurality of functional units (FUs); a depacketizing unit configured to separate inputted bitstreams according to their packet types and output encoded data, decoder description, an FU list and FUs; an FU comparing unit configured to be inputted with the FU list, to extract FUID of the FU list and compare the FUID of the FU list with FUID of FUs stored in the tool box to determine whether a new FU is in the FU list, and to be inputted with a pertinent FU from the depacketizing unit if there is a new FU in the FU list and transfer the pertinent FU to the tool box to allow the tool box to store the new FU; a decoder forming unit configured to analyze the decoder description, to load FUs required for decoding the encoded data to the decoding solution from the tool box, and to form a decoder by configuring the FUs; and a decoding solution configured to be inputted with the encoded data and decode the encoded data through the formed decoder.

The tool box can include a plurality of tool boxes, in which the FUs are stored according to their types, and the plurality of tool boxes are classified with tool box identification.

The FU list can include a tool box number (TBN) field, which indicates a tool box to which the pertinent FU belongs, and an FU number field, which indicates peculiar identification of the pertinent FU.

The tool box can include at least one of: an MPEG video tool box configured to store FUs related to MPEG video decoding; an MPEG audio tool box configured to store FUs related to MPEG audio decoding; an MPEG graphics tool box configured to store FUs related to MPEG graphic decoding; and a customized tool box configured to store customized FUs.

An encoding apparatus in accordance with an embodiment of the present invention can include: a tool box configured to store a plurality of functional units (FUs); an encoding unit configured to encode data and generate encoded data; a decoder description generation unit configured to generate a decoder description that describes FUs constituting a decoder for decoding the encoded data and the connection relation of the FUs; an FU list generation unit configured to generate and output an FU list for FUs constituting a decoder for decoding the encoded data; a packetizing unit configured to be inputted with the encoded data, to packetize and output a decoder description and an FU list corresponding to the inputted encoded data, and to be inputted with the FUs and packetize and output the inputted FUs; and an FU request signal processing unit configured to output from the tool box an FU corresponding to an FU request signal received from an outside and to input the FU to the packetizing unit.

The encoding apparatus also include a transmission bitstream generation unit generating a transmission bitstream using at least one of packets of the encoded data, decoder description and FU list.

The encoding apparatus can also include an FU transmission data generation unit transforming and generating an FU packet packetized by the packetizing unit to FU transmission data, which is data for transmission.

A decoding apparatus in accordance with an embodiment of the present invention can include: a tool box configured to store a plurality of functional units (FUs); a communication unit configured to communicate data with an outside encoding apparatus; a depacketizing unit configured to separate data received from the communication unit according to their packet types and output encoded data, decoder description, an FU list and FUs; an FU list processing and FU requesting unit configured to compare the FU list with FUs stored in the tool box to determine whether a new FU is in the FU list and to generate an FU request signal requesting the new FU to the outside encoding apparatus if there is the new FU in the FU list; a decoder forming unit configured to analyze the decoder description, to load FUs required for decoding the encoded data to a decoding solution from the tool box, and to form a reconfigured decoder by configuring the FUs; and a decoding solution configured to be inputted with the encoded data and decode the encoded data through the formed reconfigured decoder.

The depacketizing unit can be configured to be inputted with a transmission bitstream and to extract the encoded data, the decoder description and the FU list from the transmission bitstream.

The depacketizing unit can be configured to be inputted with FU transmission data, to extract the FUs from the FU transmission data and to store the extracted FUs in the tool box.

An encoding method in accordance with an embodiment of the present invention can include: (a) generating encoded data by encoding data; (b) generating a decoder description that describes functional units (FUs) constituting a decoder for decoding the encoded data and the connection relation of the FUs; (c) generating an FU list for FUs constituting a decoder for decoding the encoded data; and (d) packetizing the encoded data and the decoder description, FU list and FUs corresponding to the encoded data.

In the step (d), the encoded data, decoder description, FU list and FUs are assigned and packetized with their respective peculiar packet ID, and an encoded data packet, a decoder description packet, an FU list packet and an FU packet are generated.

The encoding can also include generating a bitstream in which the encoded data packet, the decoder description packet, the FU list packet and the FU packet are combined.

A decoding method in accordance with an embodiment of the present invention can include: separating inputted bitstreams according to their packet types and extracting encoded data, decoder description, an functional unit (FU) list and FUs; extracting functional unit identification (FUID) of the FU list and comparing the FUID of the FU list with FUID of FUs stored in a tool box to determine whether a new FU is in the FU list; transferring a pertinent FU to the tool box, if it is determined that there is a new FU in the FU list, to allow the tool box to store the new FU; analyzing the decoder description and loading FUs required for decoding the encoded data from the tool box and forming a reconfigured decoder by configuring the FUs; and decoding the encoded data through the formed reconfigured decoder.

An encoding method in accordance with an embodiment of the present invention can include: generating encoded data by encoding data; generating a decoder description that describes FUs constituting a decoder for decoding the encoded data and the connection relation of the FUs; generating an FU list for FUs constituting a decoder for decoding the encoded data; a packetizing unit configured to packetize the encoded data and a decoder description and an FU list corresponding to the encoded data and to packetize inputted FUs; and an FU request signal processing unit configured to output from a tool box an FU corresponding to an FU request signal received from an outside and to input the FU to the packetizing unit.

The encoding method can also include generating a transmission bitstream using at least one of the packetized encoded data, decoder description and FU list.

The encoding method can also include transforming and generating the packetized FU to FU transmission data, which is data for transmission.

A decoding method in accordance with an embodiment of the present invention can include: receiving a transmission bitstream from an outside encoding apparatus; separating the transmission bitstream according to packet types and extracting encoded data, decoder description and an FU list; comparing the FU list with FUs stored in a tool box to determine whether a new FU is in the FU list; generating and transmitting an FU request signal requesting the new FU to the outside encoding apparatus if it is determined that there is the new FU in the FU list; receiving an FU transmission data from an outside encoding apparatus; extracting FUs from the FU transmission data and storing the extracted FUs in the tool box; analyzing the decoder description and loading FUs required for decoding the encoded data and forming a reconfigured decoder by configuring the FUs; and decoding the encoded data through the formed reconfigured decoder.

In order to carry out the decoding method, a recording medium, which tangibly embodies a program of instructions that can be executed in a decoding apparatus and in which a program readable by the decoding apparatus is written, is provided.

In order to carry out the encoding method, a recording medium, which tangibly embodies a program of instructions that can be executed in an encoding apparatus and in which a program readable by the encoding apparatus is written, is provided.

Advantageous Effects

As described above, the method of and the apparatus for decoding a bitstream according to the present invention can decode a bitstream that is encoded in various forms (syntax, semantics) according to different standards (e.g., MPEG-1, MPEG-2, MPEG-4, MPEG-4 AVC, etc.).

The present invention can reconfigure the decoder by distinguishing and identifying the functional units for decoding.

The present invention can also store and readily identify the functional units for decoding according to their types in a plurality of tool boxes.

The present invention can generate an extended bitstream, in which a decoder description is added, so that a bitstream that is encoded in various formats (syntax, semantics) based on each standard can be decoded by a same information recognition method.

The present invention can present scheduling management of each codec and an organic process structure (e.g., parallel combination structure, serial combination structure, independent process structure, individual process structure, etc.) of each functional unit by using a decoder description.

The present invention can also allow design and construction of various systems with the described decoder description only.

The present invention can also parse bitstreams that are compressed in various encoding methods by a same information analysis method and organically control the functional units for decoding by using the parsed data.

The present invention can commonly apply a syntax analyzing method for decoding various forms of bitstreams.

The present invention can also apply a set of new commands for parsing various forms of bitstreams by a common syntax analyzing method.

The present invention can allow a decoder to readily decode a bitstream even when a syntax element is changed or deleted.

The present invention also allows element information (i.e., a result of syntax parsing) of analyzed syntax to be used by elements used for decoding a bitstream.

The present invention also allows element information of pre-analyzed syntax to be used for analyzing a following bitstream syntax element.

The present invention can be used when combining codecs for moving pictures and still pictures that process in block units, other than MPEG-1, MPEG-2, MPEG-4 and MPEG-4 AVC.

The present invention can divide functions included in various decoding processes suggested by different standards (codecs) according to functional units and store the functions in a tool box.

The present invention can use necessary functional units selectively from the tool box in order to decode bitstreams that are encoded in various forms.

The present invention can readily change, add or delete functional units stored in the tool box.

The present invention can be used for decoding and encoding by use of customized functional units that are defined by the user.

DESCRIPTION OF DRAWINGS

FIG. 12 illustrates the structure of an FU networking table in accordance with an embodiment of the present invention.

FIG. 13 illustrates the structure of a VNT table in accordance with an embodiment of the present invention.

FIG. 15 illustrates the structure of a PT table in accordance with an embodiment of the present invention.

FIG. 16 illustrates the structure of an NCT table in accordance with an embodiment of the present invention.

FIG. 17 illustrates the structure of an ET table in accordance with an embodiment of the present invention.

FIG. 20 shows an example of functional unit identification (FUID) in accordance with an embodiment of the present invention.

MODE FOR INVENTION

Figure 1:
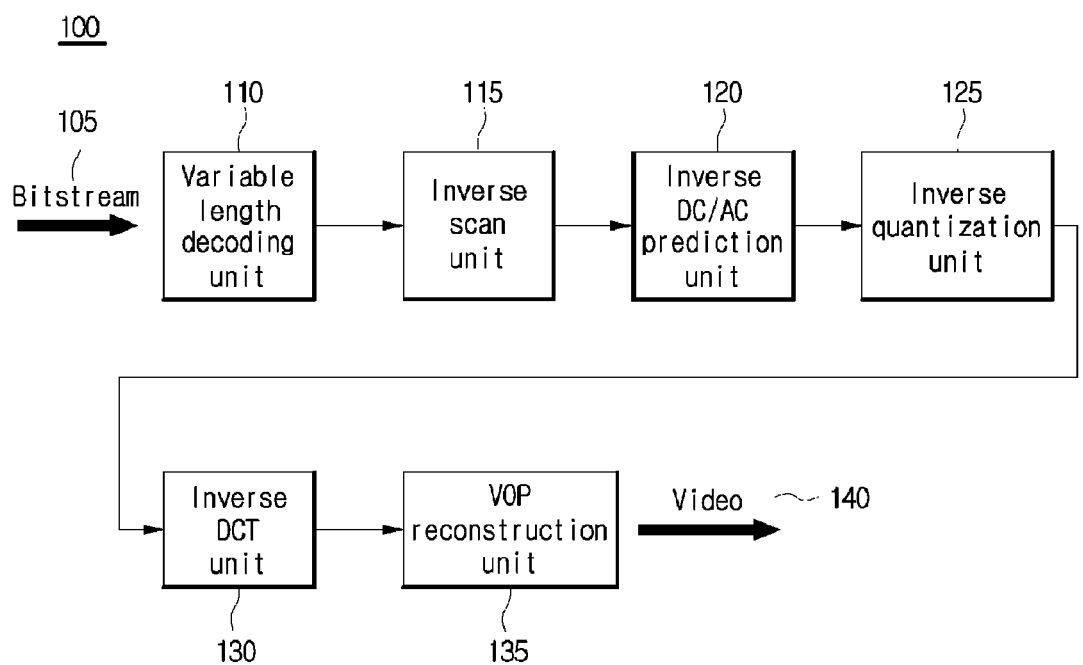
FIG. 1 is a diagram illustrating a brief structure of a typical decoder.

Since there can be a variety of permutations and embodiments of the present invention, certain embodiments will be illustrated and described with reference to the accompanying drawings. This, however, is by no means to restrict the present invention to certain embodiments, and shall be construed as including all permutations, equivalents and substitutes covered by the ideas and scope of the present invention.

Terms such as "first" and "second" can be used in describing various elements, but the above elements shall not be restricted to the above terms. The above terms are used only to distinguish one element from the other. For instance, the first element can be named the second element, and vice versa, without departing the scope of claims of the present invention. The term "and/or" shall include the combination of a plurality of listed items or any of the plurality of listed items.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

The terms used in the description are intended to describe certain embodiments only, and shall by no means restrict the present invention. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

Unless otherwise defined, all terms, including technical terms and scientific terms, used herein have the same meaning as how they are generally understood by those of ordinary skill in the art to which the invention pertains. Any term that is defined in a general dictionary shall be construed to have the same meaning in the context of the relevant art, and, unless otherwise defined explicitly, shall not be interpreted to have an idealistic or excessively formalistic meaning.

Hereinafter, some embodiments of the present invention will be described in detail with reference to the accompanying drawings. Identical or corresponding elements will be given the same reference numerals, regardless of the figure number, and any redundant description of the identical or corresponding elements may not be repeated.

Figure 2:
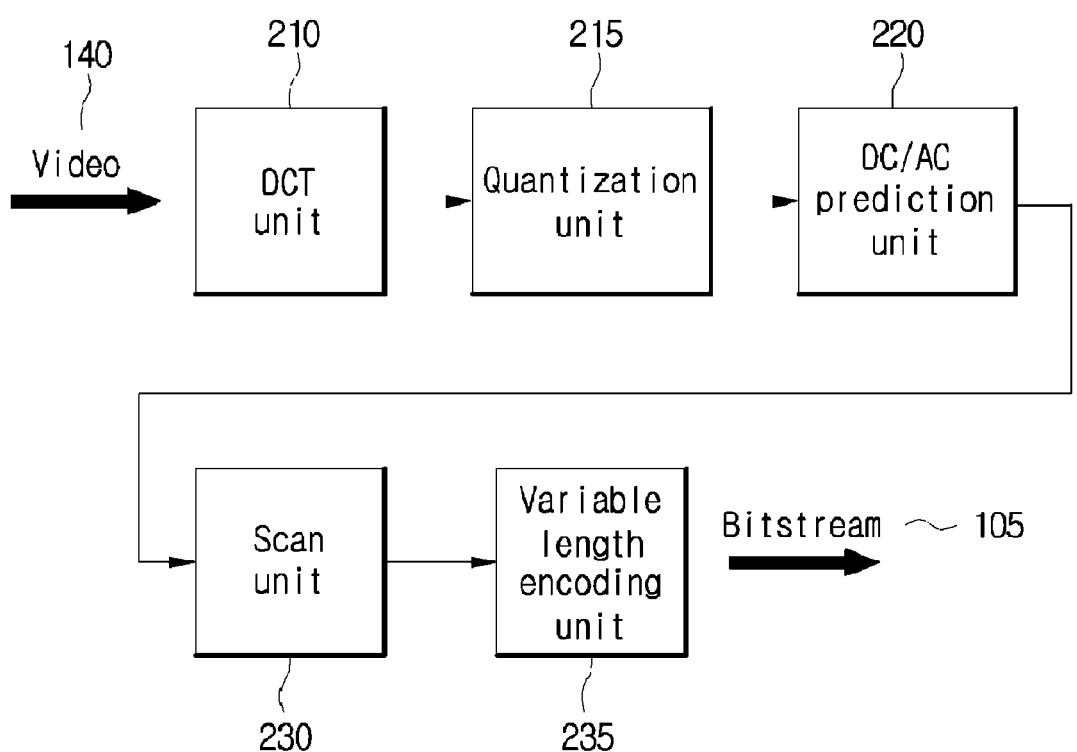
FIG. 2 is a diagram illustrating a brief structure of a typical encoder.

FIG. 1 is a diagram illustrating a brief structure of a typical decoder, and FIG. 2 is a diagram illustrating a brief structure of a typical encoder.

As illustrated in FIG. 1, a typical MPEG-4 decoder 100 includes a variable length decoding unit 110, an inverse scan unit 115, an inverse DC/AC prediction unit 120, an inverse quantization unit 125, an inverse DCT (discrete cosine transform) unit 130, and a VOP reconstruction unit 135. It shall be apparent that the structure of the decoder 100 can vary depending on the applied standard and that some element(s) can be substituted by other element(s).

Once a transferred bitstream 105 is syntax-parsed and header information and encoded video data are extracted, the variable length decoding unit 110 creates a quantized DCT coefficient by use of a predetermined Huffman table, and the inverse scan unit 115 performs an inverse scan to generate data in the same order of a moving picture 140. In other words, the inverse scan unit 115 outputs a value in an order that is inverse of the order used for scanning during the encoding. After quantization is performed during the encoding, the direction of scanning can be defined according to the distribution of frequency band values. A zig-zag scan method is commonly used, but the scan method can vary according to the codec.

Syntax parsing can be unifiedly performed in the variable length decoding unit 110 or in an element that processes the bitstream 105 prior to the variable length decoding unit 110. In such a case, since a same standard is applied to both the encoder and the decoder, the syntax parsing is processed in accordance with a predetermined criterion in order to conform to the corresponding standard.

The inverse DC/AC prediction unit 120 determines the orientation of a reference block for prediction in a frequency band by use of the size of the DCT coefficient.

The inverse quantization unit 125 inversely quantizes the inverse-scanned data. That is, DC and AC coefficients are restored by use of a quantization parameter (QP) assigned during the encoding.

The inverse DCT unit 130 performs an inverse discrete cosine transform to obtain an actual moving picture pixel value and generate a VOP (video object plane).

The VOP reconstruction unit 135 reconstructs and outputs a video signal by use of the VOP generated by the inverse DCT unit 130.

As shown in FIG. 2, an MPEG-4 encoder 200 typically includes a DCT unit 210, a quantization unit 215, a DC/AC prediction unit 220, a scan unit 230 and a variable length encoding unit 235.

As it is evident to those who are skilled in the art to which the present invention pertains, each of the elements included in the encoder 200 performs an inverse function of its corresponding element of the decoder 100. In brief, the encoder 200 encodes a video signal (i.e., a digital image pixel value) by transforming the video signal to a frequency value through discrete cosine transform, quantization, etc., and then performs variable length encoding, which differentiates the bit length according to the frequency of data, to output the bitstream in a compressed state.

Figure 3:
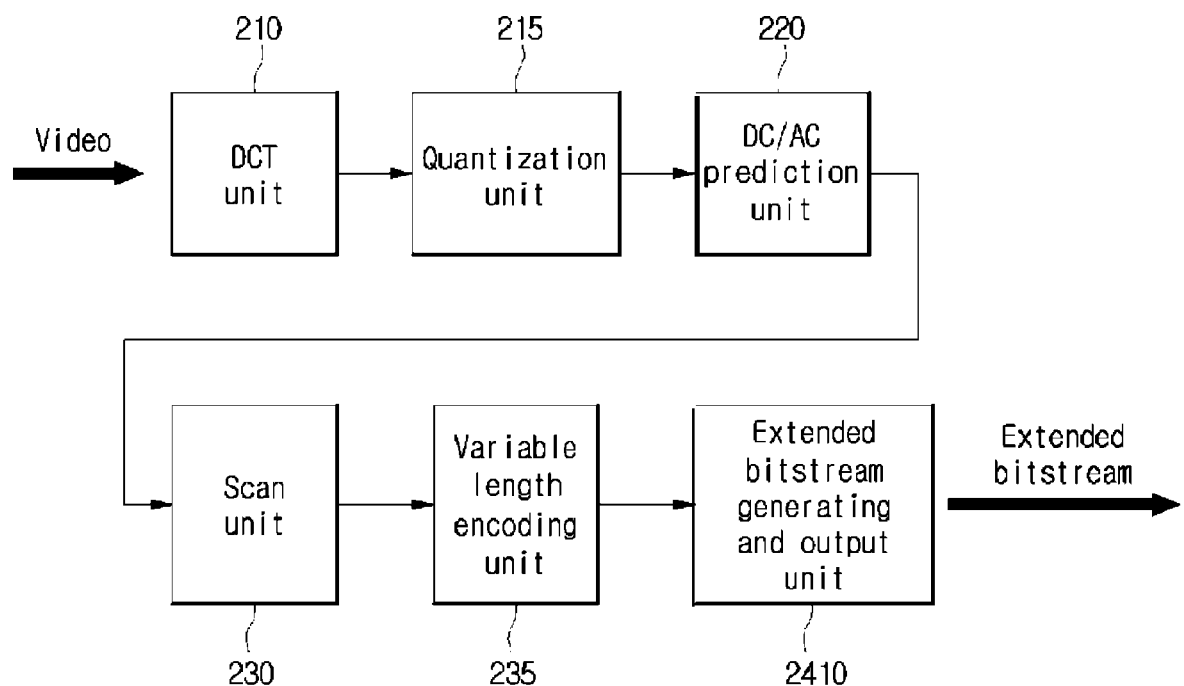
FIG. 3 is a block diagram of an embodiment of an encoder in accordance with the present invention.

FIG. 3 is a block diagram of an encoder in accordance with an embodiment of the present invention.

An encoder in accordance with the present invention additionally includes an extended bitstream generation and output unit 2410, compared to the conventional decoder 200 described earlier with reference to FIG. 2. The extended bitstream generation and output unit 2410 generates a decoder description using control information (e.g., a list and connection relation of functional units required for decoding the encoded data, input data of pertinent functional units, syntax information, syntax connection information, etc.) of a process of generating a conventional bitstream 316 that is generated by a process up to a preceding step. Moreover, an extended bitstream 305 is generated and transferred to a decoder 300 by using a generated decoder description 310 and the conventional bitstream 316. Here the functional unit is an element performing unit decoding. In other words, the functional units can be organically combined to form a decoder. For example, each of the elements constituting the decoding apparatus shown in FIG. 1 can be a functional unit.

The encoder can have a tool box (not shown) that stores the functional units that form a decoder that decodes the encoded data.

Moreover, the variable length encoding unit 235 used in this description simply refers to any element (e.g., an encoding part) in an encoder that ultimately performs decoding in order to generate the conventional bitstream 316 and is not restricted to this, and the scope of the present invention shall not be restricted by this.

In FIG. 3, it is assumed that the extended bitstream generated using decoder description information and conventional bitstream is provided to the decoder. However, it is possible that the decoder description is transferred to the decoder 300 in the form of a separate data or bitstream. In this case, it shall be apparent that an encoded decoder description generation and output unit (not shown) is placed at a tail end of the variable length encoding unit 235 to provide an encoded decoder description that is generated independent of a conventional encoding unit to the decoder 300.

The decoder description includes functional unit identification (FUID) of each of the pertinent functional units. The FUID is constituted by including a tool box number (TBN), which indicates the tool box to which the pertinent functional unit belongs in a tool box unit, and a functional unit number (FU Number), which indicates peculiar identification of the pertinent functional unit.

The FUID and tool box unit will be described later with reference to the relevant drawings (FIGS. 19 to 21) and relevant table (Table 5).

<XML-based Decoder Description>

Figure 4:
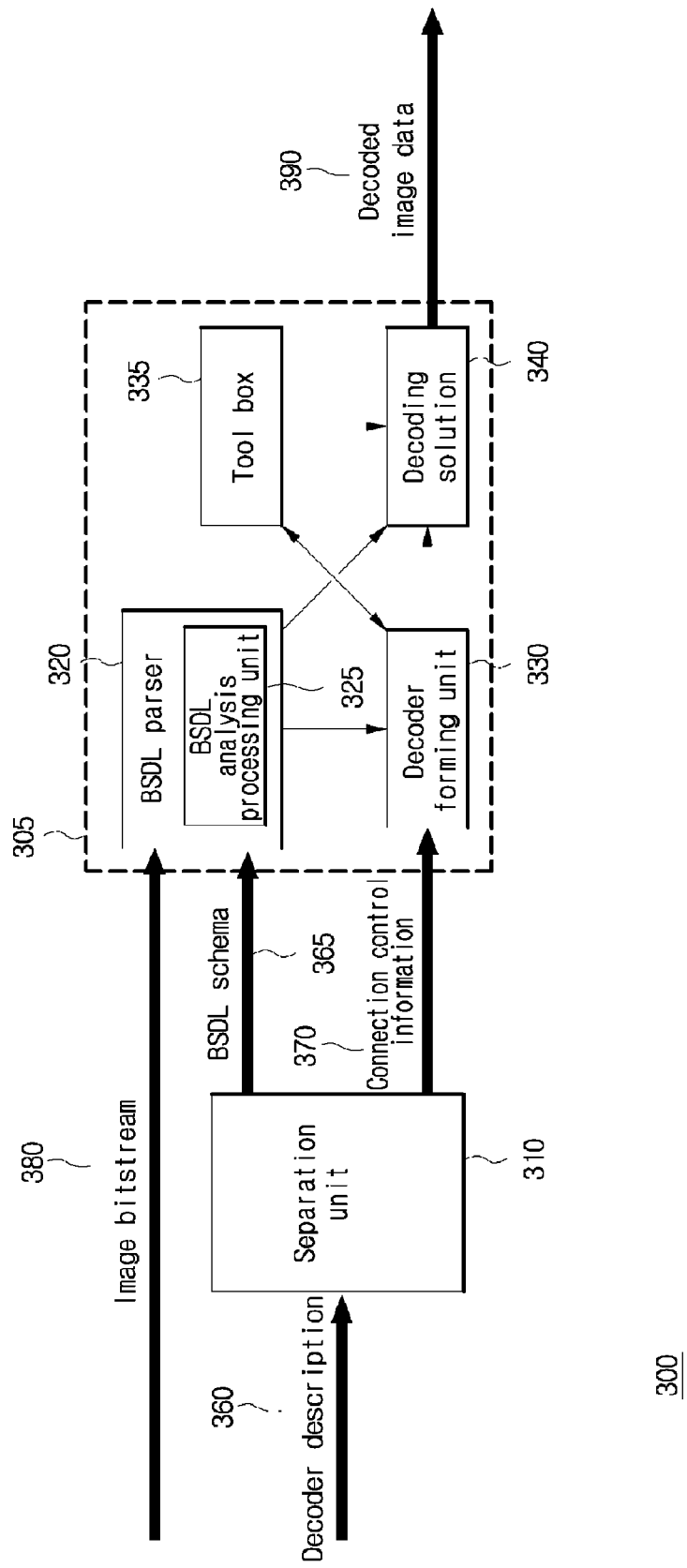
FIG. 4 is a block diagram of an embodiment of a decoder in accordance with the present invention.
Figure 5:
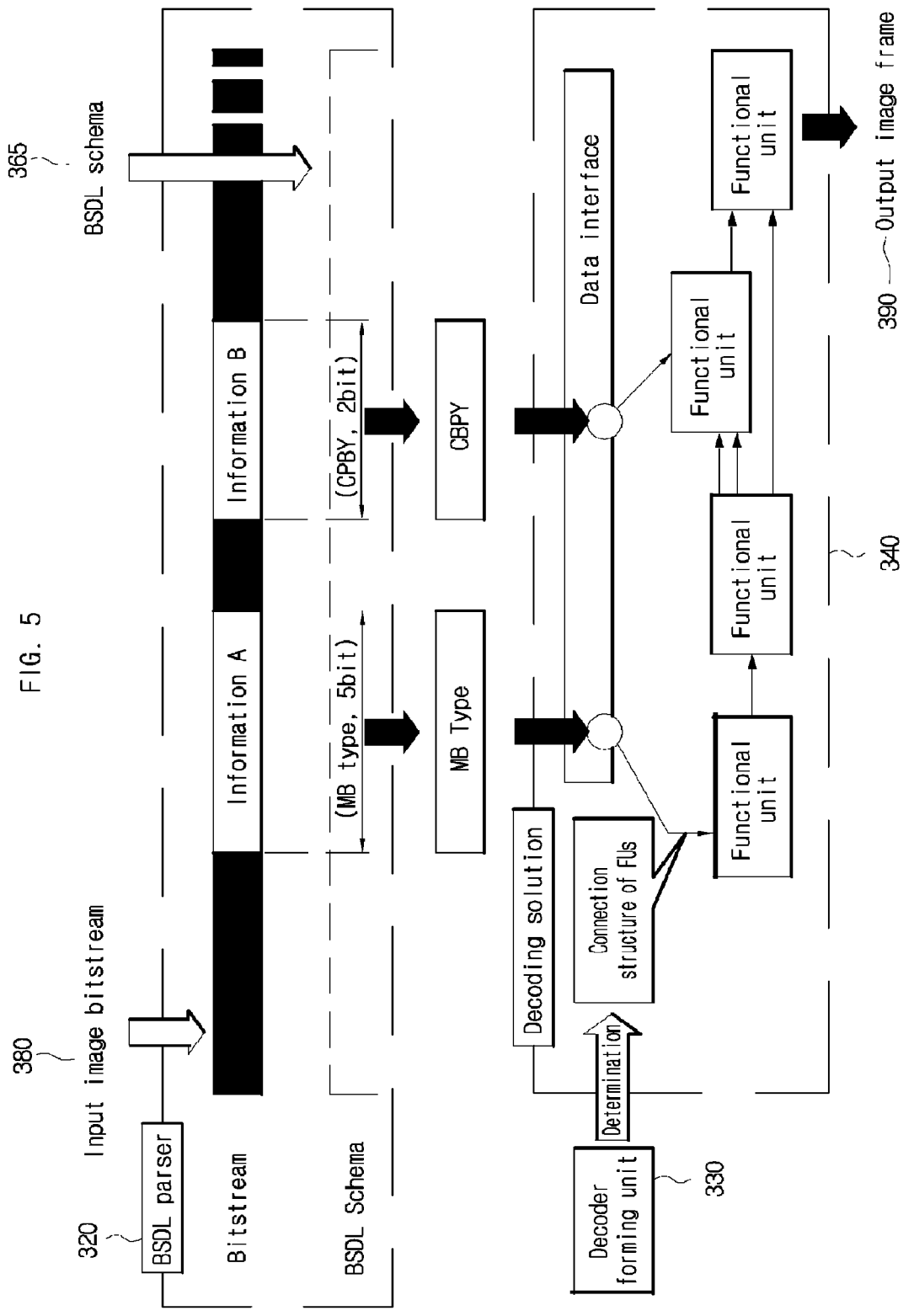
FIG. 5 is a detailed illustration of processing a bitstream by a decoding unit in accordance with an embodiment of the present invention.

FIG. 4 is a block diagram of an embodiment of a decoder in accordance with the present invention, and FIG. 5 is a detailed illustration of processing a bitstream by a decoding unit shown in FIG. 4.

A decoder description and an image bitstream shown in FIG. 4 can be, for example, information generated and provided by an encoder.

Referring to FIG. 4, the decoder 300 includes a decoding unit 305 and a separation unit 310. The decoding unit 305 includes a BSDL parser 320, a decoder forming unit 330, a tool box 335 and a decoding solution 340.

The BSDL parser 320 uses BSDL schema inputted from the separation unit 310 to analyze syntax information of the image bitstream inputted from the outside. The image bitstream inputted to the BSDL parser 320 is data encoded by an encoding method (e.g., MPEG-4, AVS, etc.). In this specification, it shall be appreciated by those who are skilled in the art that the BSDL parser 320 itself can analyze the BSDL schema or can be constituted by an outside algorithm.

The BSDL parser 320 includes a BSDL analysis processing part, which is an internal processing unit for redefining the structure of the BSCL parser 320 by reading the BSDL schema, which is described in XML.

As rules of redefining by use of the BSDL schema can vary depending on the method applied by a creator, the basic objects of redefining are as follows. Firstly, it is for recognizing information on the length and meaning of the bitstream written on the BSDL schema. Secondly, it is for reading a repetition structure and conditional execution structure that are defined on the BSDL schema and realizing a program-style routine that is actually operated by the same repetition or condition sentence. Therefore, the BSDL parser 320 prior to the redefining can be defined as a state in which functions for achieving the above objects are realized, and the redefining process can refer to a process of realizing the actually operating BSDL parser 320 by utilizing the above parsing functions.

The BSDL parser 320 is realized in a program that can constitute a fluid data flow by the control of the BSDL analysis processing part, and can be realized by use of program languages such as CAL (Caltrop Actor Language), C, C++ and Java.

A BSDL internal processing unit 2525 and the BSDL parser 320 can be realized without any restriction according to design criteria of a decoder designer. It shall be of course possible to apply a BSDL operating program such as BSDL reference software that is conventionally presented. The BSDL reference software is the official software created for a smooth operation of BSDL that is standardized by the MPEG standardizing organization, and it shall be apparent that the BSDL parser 320, which is inputted with BSDL schema, can be also readily realized by use of such software resource.

As mentioned in this specification, the structure of the BSDL parser 320-can be designed by a variety of methods chosen by the decoder designer. That is, the decoder designer can freely choose the application and design of detailed algorithm for performing the designated function of the BSDL parser 320. However, the BSDL parser 320 can be redefined by the result of reading the BSDL schema, and the result of redefining must cooperate (e.g., communicate) with other elements of the decoding unit 305.

The BSDL schema, with which the BSDL parser 320 is inputted, is described with details on syntax information included in the bitstream, and the details can include, for example, the length of the syntax information, the meaning of the syntax information, the appearance condition of the syntax information and the number of repeated appearances of the syntax information. Here, the length of the information refers to the bit length occupied by particular information, and the meaning of the syntax information refers to what the pertinent information means. For example, when a functional unit requests information called "A," the meaning of the syntax information is needed to distinguish which information is the information referred by "A." Moreover, with respect to the appearance condition or the number of repeated appearances, since appearance or the number or repetitions of some syntax information can be changed according to the attribute of the bitstream even when same size bitstreams are processed using one BSDL schema, the information can be attached to the BSDL schema in order to define such case. For example, the appearance condition can be needed to not read motion vector information when an intra frame is processed, and if a pertinent macro block has 6 blocks of the same structure, the number of repeated appearances can be used to repeat the pertinent block.

As illustrated in FIG. 5, the BSDL analysis processing unit transfers the result information of deciphering the details to the BSDL parser 320 in order to assist the BSDL parser 320 to read the information included in the bitstream according to the order defined in the BSDL schema.

The BSDL parser 320 refers to the result information provided by the BSDL analysis processing unit to covert the details of the inputted bitstream to meaningful data and provides the data to the decoder forming unit 330 and/or the decoding solution 340. Moreover, examples of meaningful data that the BSDL parser 320 provides to the decoder forming unit and/or the decoding solution 340 can include encoded image data in a predetermined macro block size, AC prediction flag (ACpred_flag) for intra-coded macro blocks, MCBPC (MB type & coded block pattern for chrominance) and CBPY (coded block pattern for luminance). The process of providing such data can be performed irrelevant to the operation of the decoder forming unit 330 or the decoding solution 340.

The present embodiment is for allowing the decoder description to be realized in a structure that uses a BSDL language system and its linkable XML-based format while the decoder decodes the bitstream by using the decoder description. Those who are skilled in the art shall readily understand that, in the present embodiment, the decoder description can have an XML format, such as BSDL and CALML, and that the role can be divided in such a way that the BSDL schema is used during the process of syntax parsing and the CALML is used for connection control between functional units.

The BSDL language is described in an XML document, which includes information on the structure and constituting method of bitstream, or in an XML schema form. This language is created to express a bitstream structure of one or more images. By using the BSDL language, the decoder can be highly compatible with other technologies even if the bitstream technology that is verified and used by the conventional MPEG standard is applied as it is. The language format and grammar about the BSDL are described in Part 5 of MPEG-B, and thus the detailed description will be omitted herefrom.

Described below is an example of constituting BSDL schema and connection control information using BSDL and XML. It shall be of course apparent that the constitution of BSDL schema and connection control information is not restricted to what is described below.

```
BSDL Schema
<xsd:element name="VideoObject">
    <xsd:complexType>
        <xsd:sequence>
            <xsd:element name="VOStartCode"
 type="m4v:StartCodeType"/>
            <xsd:element name="VOL">
                <xsd:complexType>
                    <xsd:sequence>
                        <xsd:element name="header"
                         type="VOLHeaderType"
                         bs2:ifNext="&volSC;" rvc:port="0"/>
                        <xsd:element name="VOP"
 type="VideoObjectPlaneType"
 maxOccurs="unbounded"
 bs2:ifNext="&vopSC;" rvc:port="1"/>
                    </xsd:sequence>
                </xsd:complexType>
            </xsd:element>
        </xsd:sequence>
    </xsd:complexType>
</xsd:element>
Connection Control Information
<Network name="Decoder">
<Package>
<QID>
<ID id="MPEG4 Simple Profile"/>
</QID>
</Package>
<Port kind="Input" name="BITSTREAM" />
<Port kind="Ouput" name="YUV" />
<Instance id="1">
<Class name="Parser">
<QID>
<ID id="c" />
</QID>
</Class>
<Note kind="label" name="Stream Parser" />
</Instance>
<Instance id="2">
<Class name="VS">
<QID>
<ID id="c" />
</QID>
<Note kind="label" name="Video Session" />
</Class>
</Instance>
<Connection src="" src-port="BITSTREAM" dst="1" dst-port="BITSTREAM" />
<Connection src="1" src-port="CSCI" dst="2" dst-port="CSCI" />
<Connection src="1" src-port="DATA" dst="2" dst-port="DATA" />
<Connection src="2" src-port="YUV" dst="" dst-port="YUV" />
</Network>
```

Although it is assumed in this embodiment that information such as decoder description 2560 and encoded video data 2580 is inputted from the outside, it shall be apparent that at least one of the information is already included in an element of the decoding unit 305.

Referring to FIG. 4 again, the decoder forming unit 330 controls to realize the decoding solution 340 by using the connection control information received from the separation unit 310 and/or some of the bitstream data received from the BSDL parser 320 (for example, encoded image data in a predetermined macro block size, AC prediction flag (ACpred_flag) for intra-coded macro blocks, MCBPC (MB type & coded block pattern for chrominance) and CBPY (coded block pattern for luminance)).

That is, the decoder forming unit 330 uses the connection control information, etc. to control some or all of the functional units provided in the tool box 335 to be loaded and arranged in an organic relation in the decoding solution 240.

Here, the connection control information can be written in CALML (CAL Markup Language), which is an XML format for describing a decoder constitution in CAL language (Caltrop Markup Language) that is currently discussed in the MPEG standardizing organization. The CAL language is constituted with Actors, which are program objects, and a connection relation between the Actors, and this structure of the CAL language is expressed by an XML format. An example of the expression has been already presented earlier in relation to the expression of the BSDL schema and connection control information.

Specifically, the decoder forming unit 330 is authorized to access the tool box 335, which is constituted by a number of functional units, and configures input/output connections between functional units in the tool box 335 to constitute the resulting decoding solution 340. Here, the input/output connection structure and executing order between the functional units are configured by referring to the connection control information. Moreover, it is possible that some information is transferred from the BSDL parser 320 in order to distinguish the kinds of the inputted bitstream and the transferred information can be referred during the process of connecting the functional units. Once the connection structure between the functional units is determined, the connection structure can be regarded as an independent decoder that can analyze and decode all kinds of bitstreams intended by the creator of the pertinent decoder description, assuming that data is continuously inputted from the outside. This completed connection structure of the functional units can be named as the decoding solution 340.

The tool box 335 includes a plurality of functional units, which are embodied to carry out a respective predetermined process. Each of the functional units can be also embodied as a combination of program codes.

The functional units included in the tool box 335 can be further grouped into a plurality of tool boxes according to their functions. For example, the functional units for MPEG can be grouped in a first tool box, and the functional units for functions other than MPEG can be grouped in a second tool box. Alternatively, the functional units for MPEG-2 can be grouped in the first tool box, and the functional units for MPEG-4 can be grouped in the second tool box, while the functional units for AVS, which is the digital TV compression standard in China, can be grouped in a third tool box.

Of course, the tool box 335 itself can be embodied in a plurality to have independent relations with the decoder forming unit 330 and the decoding solution 340. In this case, although not illustrated, the first tool box, the second tool box, etc. can be embodied as independent tool boxes.

However, for the convenience of description, it will be assumed here that a plurality of tool boxes are included in one tool box 335 or all functional units are scattered in one tool box 335.

The tool box 335 is an area in which the functional units (FU) for carrying out their respective functions are included, and the functional units are loaded to the decoding solution by the connection control of the decoder forming unit 330 to form a successive connection operation relation and outputs encoded image data included in an image bitstream 380 as decoded image data.

Examples of functional units included in the tool box 335 can include a DF (De-blocking Filter) FU, a VR (VOP Reconstructor) FU, an FFR (Frame Field Reordering) FU, an IPR (Intra prediction and Picture Reconstruction) FU, an IT (Inverse Transform) FU, an IQ (Inverse Quantization) FU, an IAP (Inverse AC Prediction) FU, an IS (Inverse Scan) FU and a DCR (DC Reconstruction) FU.

For an IT4×4 FU, an IQ4×4 FU and a DCR4×4 FU, the size of a block being processed is 4×4. This is because MPEG-4 AVC processes the data in the block size of 4×4 while, in the case of MPEG-1/2/4, the data in the block size of 8×8 is processed during the transform, quantization and prediction.

It shall be apparent that all functional units for carrying out a data decoding function can be included in the tool box 335 regardless of the standard applied to the functional unit and any necessary functional units developed during the advancement of technology can be added to the tool box 335. It shall be also apparent that existing functional units can be modified and any unnecessary functional unit may be deleted. For example, in case an IS4×4 functional unit and the like that process the data in the block size of 4×4 is additionally needed for a decoding process, the pertinent functional units can be added to the tool box 335. Also, an SPR (Special Prediction) functional unit and the like can be added for carrying out an intra prediction in MPEG-4 AVC.

It shall be apparent that each functional unit provided in the tool box 335 is not independently present in each standard and that the functional units capable of the same process regardless of the standard can be combined in one functional unit. The function of each functional unit is well known to those of ordinary skill in the art, and thus will be briefly described herein.

The DF functional unit is the de-blocking filter of MPEG-4 AVC, and the VR FU is the functional unit that stores a restored pixel value.

The FFR FU is the functional unit for the interlaced mode, and the IPR FU is the functional unit that stores a restored pixel value after intra prediction of MPEG-4 AVC. As described above, the intra prediction of MPEG-4 AVC can be carried out by the SPR FU.

The IT FU is the functional unit that carries out inverse transform of DC and AC values, and the IQ FU is the functional unit that carries out inverse quantization of AC values.

The IAP FU is the functional unit that carries out inverse AC prediction of AC values, and the IS FU is the functional unit that inverse scans AC values. The DCR FU is the functional unit that carries out inverse prediction and inverse quantization of DC values.

The decoding solution 340 is a result generated by the decoder forming unit 330 and is inputted with bitstream data divided into syntax information units (or encoded video data in predetermined macro block size) from the BSDL parser 320.

As illustrated in FIG. 5, the inputted bitstream data can be inputted through a tangible or intangible data interface for inputting/outputting data. In the case of software, the data interface can be embodied as a particular memory buffer, a virtual port that defines the flow of data, or a parameter on a program. In the case of hardware, the data interface can be a connection line on a circuit. The data interface can be embodied in various other ways.

The data can be continuously inputted through a pertinent interface and regardless of the particular functional unit's carrying out of a process (for example, so as to be capable of parallel process). The decoding solution 340 processes the inputted data and outputs the processed data as decoded image data. As illustrated in FIG. 5, the data can be started from a data interface and transferred to each functional unit, and the functional unit can process the pertinent data and transfer the data to a following functional unit. This flow of data is predetermined by the decoder forming unit 330.

Included in the decoding solution 340 can be data provided by the BSDL parser 320 (e.g., information extracted by syntax parsing of bitstream) and a storage unit for storing result data by the process of each functional unit. Each functional unit loaded by the control of the decoder forming unit 330 can carry out an assigned process by using at least one of data provided by the BSDL parser 320 and result data of a priorly operated functional unit. In this case, the functional unit to carry out a following process needs to recognize that the operation of the preceding functional unit is completed. For this, the decoder forming unit 330 can continuously monitor whether each functional unit has completed its operation and control whether a following functional unit should start its operation. Moreover, by providing a separate area for each functional unit in the storage area and allowing process result data of a preceding functional unit to be stored in a storage area for a following functional unit by the control of the decoder forming unit 330, it will be possible for the following functional unit to start its operation immediately after the data required for carrying out the process is stored in its storage area. It shall be apparent that there can be other various ways to control the starting time between the functional units.

The storage unit can be provided in the decoder forming unit 330, and the decoder forming unit 330 can provide the data provided by the BSDL parser 320 (e.g., information extracted by syntax parsing of bitstream) and the result data by the process of each functional unit to a functional unit that will carry out the current process.

Hereinafter, the operation of the decoding unit 305 will be briefly described with reference to FIG. 5.

Once an input image bitstream and BSDL schema are inputted from the outside (that is, information A and information B are assumed to be present at particular points of the bitstream), the BSDL parser 320 reads the BSDL schema and recognizes that 5 bits of MB type data are present at a point corresponding to the information A and 2 bits of CBPY data are present at a point corresponding to the information B.

Then, the BSDL parser 320 uses the recognized information to read the bits at each point according to the number of assigned bits, and transfers the read information to the decoding solution 340 according to its given meaning.

The decoding solution 340 receives from the BSDL parser 320 and processes data named MP Type and CBPY. As described earlier, the functional units are loaded and embodied in the decoding solution 340 by the connection control of the decoder forming unit 330.

The data interface that is present in the decoding solution 340 receives data transferred from the outside and, by referring to the connection relation between the functional units formed by the connection control information, transfers the data to the functional units that request the pertinent data.

Each functional unit carries out the decoding process in accordance with the predetermined connection relation (that is, connection relation for processing the data). Every data flow and connection relation between functional units is based on what the decoder forming unit 330 has priorly constituted. An output image frame is outputted to the outside by successive processes of the functional units.

As described above, the storage unit can be provided in the decoder forming unit 330 and/or the decoding solution 340. This is because the data can be provided by the BSDL parser 320 without intermission and in parallel with the decoding process. Moreover, each functional unit can read and use necessary data from the storage unit.

Moreover, the BSDL parser 320 can provide data for decoding the encoded image data to the decoder forming unit 330 and have the decoder forming unit 330 provide the data to the decoding solution 340, or the BSDL parser 340 itself can provide the data to the decoding solution 340.

Referring to FIG. 4 again, the separation unit 310 separates the inputted decoder description 2560 into separate information and inputs the separated information to the decoding unit 305. The decoder description 2560 inputted to the separation unit 310 can include BSDL schema 2565 for describing the structure of bitstream and CALML data 2570 for describing the decoding process of bitstream. The two kinds of data can be described independently according to XML grammar, or can be combined and transmitted together for an efficient decoder operation.

Figure 6:
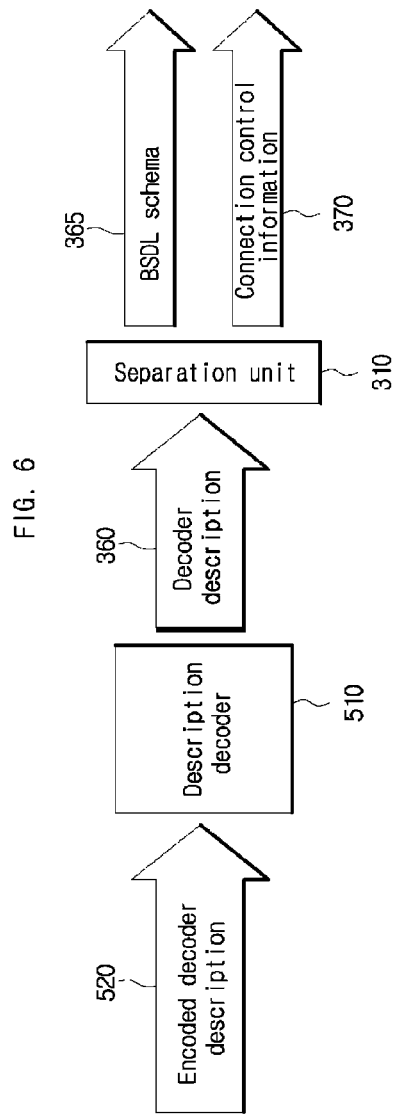
FIG. 6 illustrates a process of inputting a decoder description in accordance with another embodiment of the present invention.

FIG. 6 shows a process of inputting a decoder description in accordance with another embodiment of the present invention.

As illustrated in FIG. 6, the decoder 300 can additionally include a description decoder 510. The description decoder 510 can generate the decoder description 2560 by decoding an encoded decoder description 520 that is inputted and provide the decoder description 2560 to the separation unit 310.

By encoding and transmitting/receiving the decoder description 2560, the amount of data being transmitted/received can be reduced.

Figure 7:
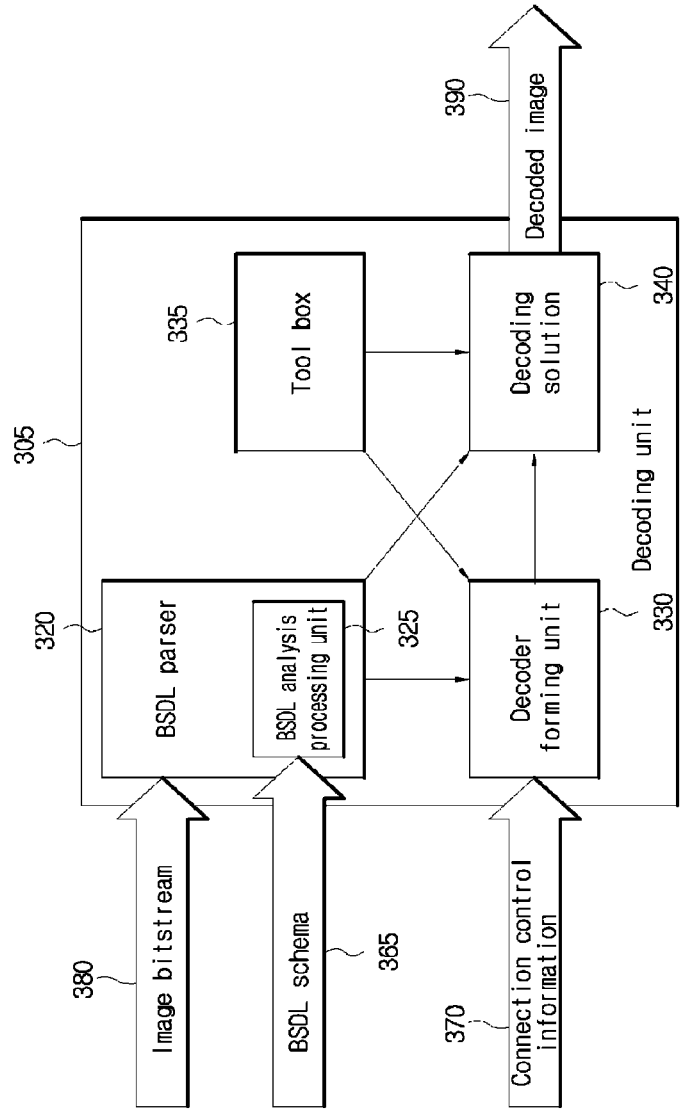
FIG. 7 is a block diagram of another embodiment of a decoder in accordance with the present invention.

FIG. 7 is a block diagram of another embodiment of the decoder in accordance with the present invention.

It has been described already with reference to FIG. 4 that the decoder description 2560 and the image bitstream are inputted to the decoding unit 305, and with reference to FIG. 6 that the encoded decoder description 520 and the image bitstream 380 are inputted to the decoding unit 305.

Figure 8:
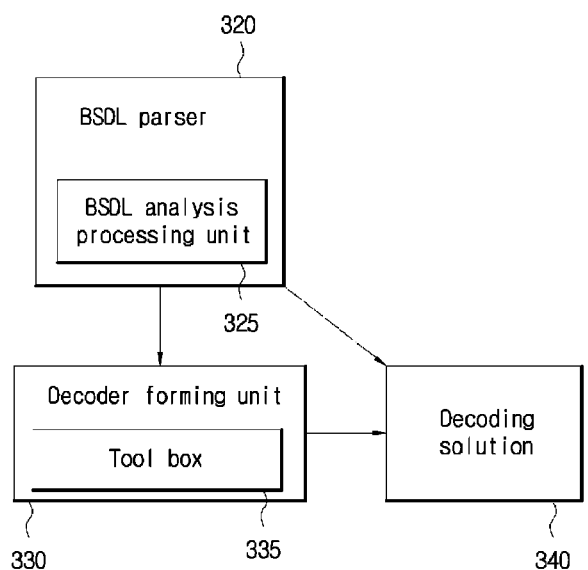
FIG. 8 is a block diagram of another embodiment of a decoding unit shown in FIG. 4.

However, as illustrated in FIG. 7, it shall be apparent that the constitution information of the decoder description 2560 can be primitively separated and inputted to the decoding unit 305. In this case, it shall be apparent that the earlier-described separation unit 310 and decoder description 2560 can be omitted. FIG. 8 shows the constitution of a decoding unit in accordance with another embodiment of the present invention.

The decoding unit 305 that is embodied by separating the tool box 335 and decoder forming unit 330 has been described already with reference to FIGS. 4 to 7.

However, as illustrated in FIG. 8, it shall be apparent that the tool box 335 can be embodied by being included as an element of the decoder forming unit 330.

In this case, the decoder forming unit 330 can include not only a function of controlling the connection structure between the functional units but also a function of selecting a functional unit to be used, and through this, various types of decoding solution 340 can be embodied.

Figure 9:
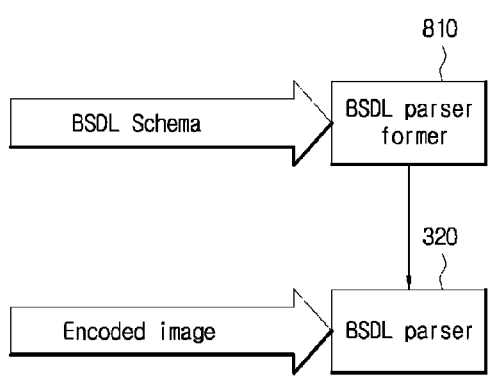
FIG. 9 illustrates a configuration of a BSDL parser in accordance with another embodiment of the present invention.

FIG. 9 illustrates a configuration of a BSDL parser in accordance with another embodiment of the present invention.

The BSDL parser 320 that includes the BSDL analysis processing unit has been described earlier with reference to FIG. 4.

However, the BSDL parser 320 in accordance with the present invention can be predefined and provided from the outside of the decoder 300 before the start of decoding a bitstream. Therefore, the earlier-described BSDL analysis processing unit can be omitted. Here, a BSDL parser former 2610 can be constituted by using a conventional application program, such as BSDL reference software.

Hitherto, the BSDL parser as an independent element processing a designated operation has been described. The BSDL parser can be embodied as a functional unit included in the tool box or can be embodied to be already included as an independent element in the decoding solution. In case the BSDL parser is provided in the tool box, the decoder forming unit should load and control the BSDL parser to carry out its process by using the connection control information before the functional units that operate for bitstream decoding are operated. Similarly, in case the BSDL parser is already included in the decoding solution, the decoder forming unit should control the BSDL parser to carry out its process first before the loaded functional units start to carry out their processes. In either case, the operation and function of the BSDL parser are same as the earlier description with reference to relevant drawings, and detailed description thereof will be omitted herefrom. However, it should be noted that the subject that initially receive the BSDL schema and/or bitstream needs to be changed to the decoder forming unit and/or decoding solution.

Hitherto, a decoding apparatus and a syntax analysis method for bitstream decoding in accordance with the present invention have been described with respect to MPEG-4 AVC, but it shall be apparent that the decoding apparatus and the syntax analysis method can be equivalently applied without any restriction to MPEG-1, MPEG-2, MPEG-4, AVS and other video encoding/decoding standards.

Moreover, it shall be apparent that the information included in the connection control information is described not only as information on a connection relation between functional units and on a process required for the pertinent functional unit for carrying out the decoding by one standard but also as information for carrying out the decoding based on a plurality of standards.

For example, in case it is assumed that the first several frames of an image bitstream are encoded in MPEG2, the following several frames in MPEG-4, and the remaining frames in MPEG-1, it shall be apparent that the connection control information is defined for decoding of the encoded image data in such a way that the functional units, which are included in the tool box 335 based on their respective standards, of the differently-encoded frames can be organically combined and operated.

Hereinafter, yet another embodiment of a decoder in accordance with the present invention will be described with reference to relevant drawings. However, in describing yet another embodiment, any element that carries out an identical or very similar function to the previously-described embodiment will be rendered the same name and reference numeral, and description of such element will not be redundantly provided. For example, the tool box 335, decoder forming unit 330 and decoding solution 340 illustrated in FIG. 11 are fundamentally identical to the earlier-described elements.

<CDDL-based Decoder Description>

Figure 10:
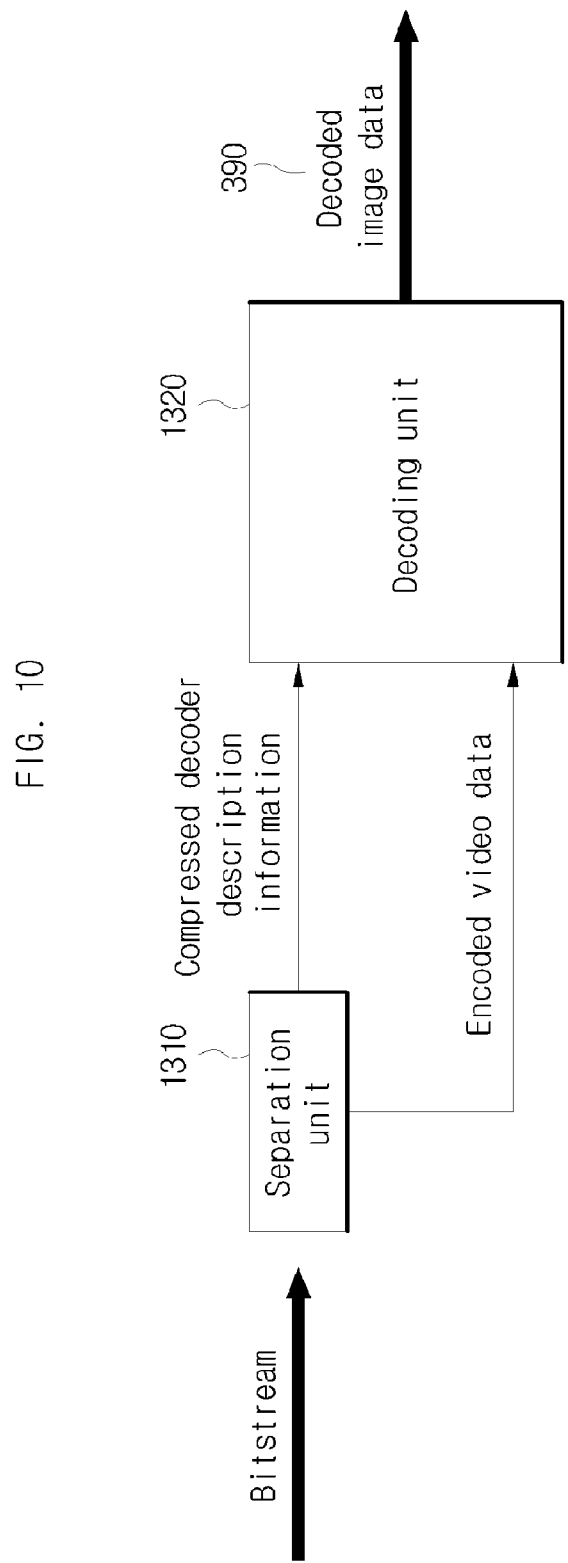
FIG. 10 is a block diagram of yet another embodiment of a decoder in accordance with the present invention.
Figure 11:
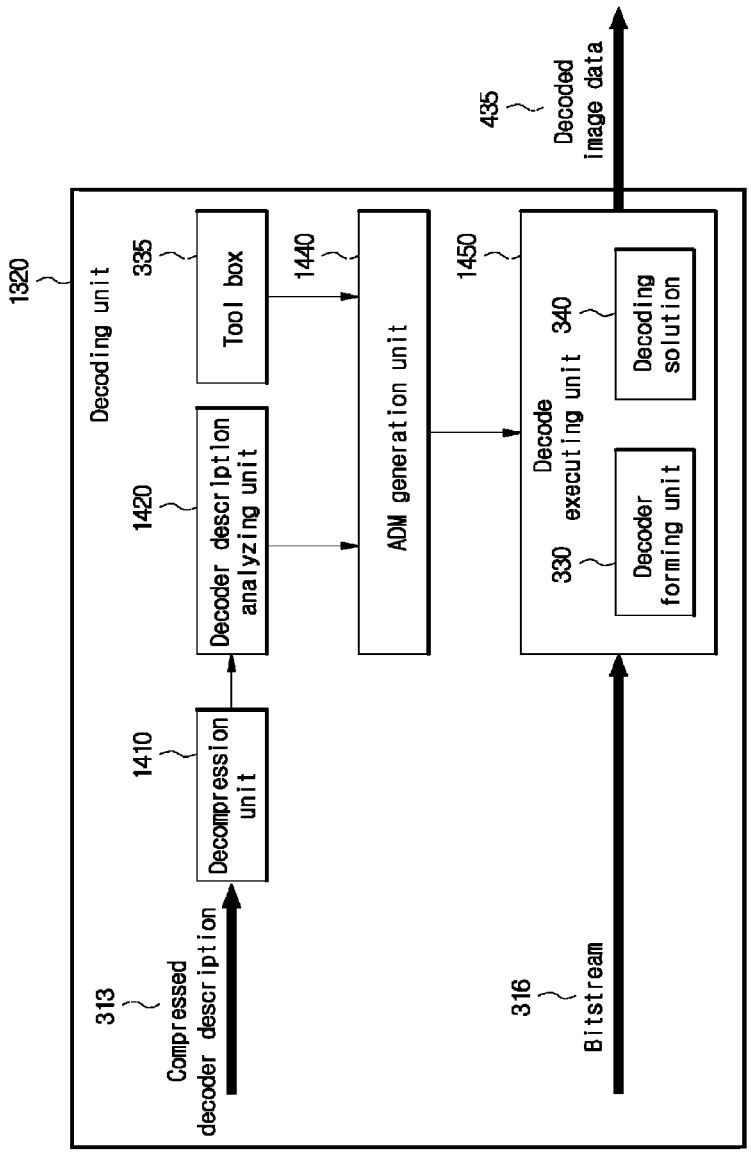
FIG. 11 is a block diagram of an embodiment of a decoding unit shown in FIG. 10.

FIG. 10 is a block diagram of yet another embodiment of a decoder in accordance with the present invention, and FIG. 11 shows a brief configuration of an embodiment of a decoding unit shown in FIG. 10.

In the embodiment described hereinafter, an inputted decoder description is a table-based decoder description (CDDL (Compact Decoder Description Language)-based decoder description, hereinafter), which is compressed in a binary form and transferred to a decoder.

The decoder can combine necessary functional units according to the format of an inputted bitstream to reconfigure the decoder. Accordingly, even if a bitstream encoded in any form is inputted, the decoder in accordance with the present invention can decode the bitstream by forming a decoder corresponding to the inputted bitstream. Hereinafter, the decoder according to the present invention will be described in more detail with reference to relevant drawings.

As described earlier, the decoder description is provided to the decoder together with the bitstream. The decoder description can be provided to the decoder in the form of a bitstream 305 that is integrated with the bitstream or in the form of independent data. Of course, if information corresponding to the decoder description is pre-stored in a particular storage unit of the decoder, the providing of the decoder description can be omitted. However, in the following description, it will be assumed that the data is provided by being included in the bitstream.

The decoder in accordance with another embodiment of the present invention includes a separation unit 310 and a decoding unit 320. It shall be apparent that at least one of the element (e.g., the separation unit 310 itself, the decoding unit 320 itself or at least one element included in the decoding unit 320) of the illustrated decoder can be realized in a software program (or a combination of program codes) that is embodied to carry out a function that will be described below.

The separation unit 310 separates an inputted bitstream into a compressed decoder description and encoded video data and inputs them into the decoding unit 320.

The separation unit 310 can input a compressed decoder description 313 into a decompression unit 410 and input encoded video data 316 into a decode executing unit 450. As described above, if the compressed decoder description and the encoded video data are each inputted as independent data, the separation unit 310 can be omitted. Moreover, the encoded video data can be a same or similar form of data as the bitstream 105 of FIG. 1.

The decoding unit 320 decodes the encoded video data 316 using the compressed decoder description 313 inputted from the separation unit 310 and outputs decoded image data 390. Hereinafter, the constitution of the decoding unit 320 will be described in detail with reference to FIG. 11.

Referring to FIG. 11, a decoding unit 1320 includes a decompression unit 1410, a decoder description analyzing unit 1420, a tool box 335, an ADM generation unit 1440 and a decode executing unit 1450. The decode executing unit 1450 includes a decoder forming unit 330 and a decoding solution 330.

The decompression unit 1410 decompresses the compressed decoder description 313, which is inputted from the separation unit 1310, according to a decompression method and outputs the decoder description 313 to the decoder description analyzing unit 1420. More specifically, the decoder description is compressed in a binary form according to a rule, and the decompression unit decodes the binary form of compressed decoder description and decompresses and outputs a corresponding CCDL-based decoder description.

The decoder description analyzing unit 1420 transforms the decompressed CCDL-based decoder description to an XML-based decoder description and outputs the decoder description to the ADM generation unit 1440. It shall be of course apparent that it is possible to omit the decoder description analyzing unit 420 and directly transform the inputted binary data to the XML-based decoder description and output the decoder description.

The ADM generation unit 440 generates an abstract decoding model (ADM) that includes information on a plurality of functional units, each of which has one or more input/output ports, and information on connection between the ports.

The ADM generation unit 440 generates the ADM that can decode a bitstream, by configuring the received functional unit according to context control information, connection control information and parsing control information.

By using the ADM, the decode executing unit 450 can decode the inputted image by using corresponding functional units stored in the tool box through the decoder forming unit 330 and the decoding solution 340 as described above. Moreover, it shall be apparent that the decoding executing unit 450 can decode the inputted image by directly receiving the XML-based decoder description.

Hereinafter, the CCDL-based decoder description (DD) in accordance with an embodiment of the present invention will be described.

The CCDL-based DD is classified into an FU networking table group, which describes an FU networking, which is the connection relation between FUs that are needed to constitute the ADM and/or decoding solution, and a syntax parsing table group, which is for syntax parsing.

The FU networking table group includes a virtual network table (VNT), a functional unit instance table (FUIT), a network connection table (NCT), a parameter table (PT), and expression table (ET) and a type table (TT).

The syntax parsing table group includes a CSCIT (Control Signal and Context Information Table), an SET (Syntax Element Table), an SRT (Syntax Rule Table) and a DVT (Default Value Table).

Hereinafter, the FU networking table will be described, followed by the syntax parsing table, with reference to relevant drawings.

FIG. 12 shows the structure of the FU networking table in accordance with an embodiment of the present invention.

The FU networking table used in the CCDL-based DD is described in a binary expression bitstream according to the structure shown in FIG. 12.

In each table, a table start code and a table code for identifying the table are described. Substantial table details are made binary to form a bitstream. Once the details of one table are completely written, that is, the entire details of one table are written, in a bitstream, a table end code is added.

The table start code is a fixed value of 24-bit binary number (111111111111111111111110), and the table end code is a fixed value of 24-bit binary number (111111111111111111111111). The table code consists of a 4-bit binary number, as shown in the below Table 1, in order to identify a unique table number.

TABLE 1

| Table | Code |
|---|---|
| VNT | 0100 |
| NCT | 0101 |
| PT | 0110 |
| FUIT | 0111 |
| TT | 1000 |
| ET | 1001 |
| reserved | 1010~1111 |

FIG. 13 shows the structure of the VNT table in accordance with an embodiment of the present invention.

As illustrated in FIG. 13, the VNT table includes FUID, VN name, INPUT ports, OUTPUT ports and QID name fields.

It is possible that in the networks, each of which is a collection of functional units, the structure may be the same but the data used for input or output may have the same structure. In order to efficiently embody a plurality of networks that have the same structure but different inputs/outputs, a basic template object, which uses a concept of inheritance, is generated, and from this template as a parent, a necessary lower object (i.e., children, inherited object) is created. The VNT describes information corresponding to the basic template.

FUID uses an index number indicating the ordinal position of the functional unit in the tool box because the functional unit may or may not already exist in the tool box. If the functional unit is present in the tool box, the FUID flag is set as "1," and if the functional unit is not present in the tool box, the FUID flag is set as "0." In case the FUID flag is set as "0," the FUID is skipped without being described.

VN name indicates the name of the functional unit. When VN name is written as a binary number in a bitstream, the string length of the name is described first (8 bits), and then the English characters are written one by one. Each English character can be expressed in Ascii code.

Version indicates the version of the functional unit. If there is a version for the functional unit, the version flag is set as "1," and if there is no version, the version flag is set as "0." When Version is written as a binary number in a bitstream, the string length of the version is described first (8 bits), and then the English characters are written one by one. Each English character can be expressed in Ascii code.

There can be a multiplicity of input ports. Before the name of one input port is binarized and written, the length of the input port name is expressed in 8 bits, and then the English characters of the input port is written one by one. Since the type of input port may or may not exist, the type flag for the input port indicates whether there is type for the input port. If the type flag is set as "1," the Type table index is described in 8 bits, and otherwise, the Type table index is skipped without being described. In case there are a number of input ports, an INPUT ports flag indicates whether all of the input ports are completely written after description of one input port is finished. If all of the input ports are completely described, the INPUT ports flag is set as "1," and if there are more input port(s) to be written, the INPUT ports flag is set as "0." Thereafter, the remaining input ports are written in the same manner.

There can also be a multiplicity of output ports, and the manner of writing in a binary expression in the bitstream is identical to that of the input ports.

QID name is an appropriate identifier of the functional unit, and indicates the string used. Since every QID name does not necessarily have a QID name, whether there is a QID name is described in 1 bit. If the flag is set as "0," the QID is skipped without being described. If the flag is set as "1," the name of QID is described in 8 bits. Thereafter, the English characters of QID name are written one by one. Each English character can be expressed in Ascii code.

The VNT table inputted with the above structure of binary bitstream is transformed to an XML-based decoder description in the decompression unit 1410 and/or the decoder description analyzing unit 1420 in accordance with a certain rule. That is, table abbreviations (English characters) indicating the table are used, and the details of the table start with "{" and end with "}". Each field of the table is separated by "," and each row starts with "(" and ends with ")". In case one field has multiple values, the field starts with "{" and ends with "}", and the expression of a character is described between the " " marks.

The VNT table is expressed in the following text form.

```
{
    ([FU_ID,] (VN Name), (Version),{INPUT PORTS},
  {OUTPUT PORTS}, [QID name]),
    ...
}
```

An embodiment of the VNT table for MPEG-4 SP that supports the XML format is as follows.

```
VNT
{
    //0
    (-, "decoder", -, "mpeg", -, {"video_Y", -, "video_U", -, "video_V", -},
"mpeg4"),
    (1, "parser", -, "BITS", -, {"BTYPE_Y", -, "BTYPE_U", -, "BTYPE_V", -,
"MV_Y", -, "MV_U", -, "MV_V", -, "B_Y", -, "B_U", -, "B_V", -},-),
    (-, "intra_FUs_16×16_Y", -, {"BTYPE", -, "QFS", -}, "f", -, "mpeg4"),
    (-, "intra_FUs_8×8_C", -, {"BTYPE", -, "QFS", -}, "f", -, "mpeg4"),
    (-, "motion_Y", -, {"MV", -, "BTYPE", -, "TEX", -}, "VID", -, "mpeg4"),
    //5
    (-, "motion_U", -, {"MV", -, "BTYPE", -, "TEX", -}, "VID", -, "mpeg4"),
    (-, "motion_V", -, {"MV", -, "BTYPE", -, "TEX", -}, "VID", -, "mpeg4"),
    (-, "byte2bit", -, "in8", -, "BITS", -, -),
    (2, "Address16×16", -, {"MV", -, "BTYPE", -}, {"WA", -, "RA", -, "halfpel", -},
-),
    (3, "Framebuf", -, {"RA", -, "WA", -, "WD", -}, "RD", -, -),
    //10
    (4, "Interpolate", -, {"RD", -, "halfpel", -}, "MOT", -, -),
    (5, "Add", -, {"MOT", -, "TEX", -, "BTYPE", -}, "VID", -, -),
    (6, "Address8×8", -, {"MV", -, "BTYPE", -}, {"WA", -, "RA", -, "halfpel",
-}, -),
    (7, "DCSplit", -, "IN", -, {"DC", -, "AC", -}, -),
    (-, "DCR_16×16_L", -, {"BTYPE", -, "QFS_DC", -}, {"QF_DC", -, "PTR", -,
"AC_PRED_DIR", -, "SIGNED", -, "QUANT", -}, "cal"),
    //15
    (8, "InverseScan", -, {"QFS_AC", -, "AC_PRED_DIR ", -}, "PQF_AC", -, -),
    (9, "IAP_16×16", -, {"PQF_AC", -, "PTR", -, "AC_PRED_DIR", -},
"QF_AC", -, -),
    (10, "Dequant", -, {"AC", -, "DC", -, "QP", -}, "OUT", -, -),
    (11, "idct2d", -, {"\in\", -, "signed", -}, "out", -, -),
    (-, "DCR_8×8_C", -, {"BTYPE", -, "QFS_DC", -}, {"QF_DC", -, "PTR", -,
"AC_PRED_DIR", -, "SIGNED", -, "QUANT", -}, "cal"),
    //20
    (12, "IAP_8×8", -, {"PQF_AC", -, "PTR", -, "AC_PRED_DIR", -},
"QF_AC", -, -),
    (13, "DCR_addressing_8×8", -, "BTYPE", -, {"A", -, "B", -, "C", -}, -),
    (14, "DCR_invpred_8×8_C", -, {"BTYPE", -, "A", -, "B", -, "C", -, "QFS_DC",
-}, {"QF_DC", -, "PTR", -, "AC_PRED_DIR", -, "SIGNED", -, "QUANT",
-}, -),
    (15, "DCR_addressing_16×16", -, "BTYPE", -, {"A", -, "B", -, "C", -}, -),
    (16, "DCR_invpred_16×16_L", -, {"BTYPE", -, "A", -, "B", -, "C", -, "QFS_DC",
-}, {"QF_DC", -, "PTR", -, "AC_PRED_DIR", -, "SIGNED", -, "QUANT", -}, -)
}
```

Figure 14:
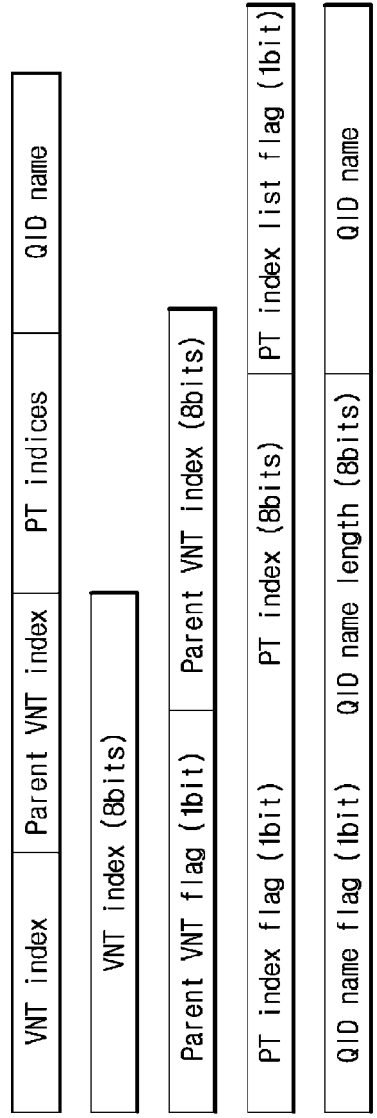
FIG. 14 illustrates the structure of an FUIT table in accordance with an embodiment of the present invention.

FIG. 14 shows the structure of the FUIT table in accordance with an embodiment of the present invention.

As illustrated in FIG. 14, the FUIT table includes VNT index, Parent VNT index, PT indices and QID name fields. Stored in FUIT is major information for generating objects used as the network that is actually needed based on a basic template, which is VNT information. The actually needed network can be expressed as a lower object (children, inherited object, instance) that is derived from the basic template.

VNT index is an index of the VNT table for indicating one functional unit.

Parent VNT index, which indicates a basic template that is required by the lower object (instance), is an index for referencing in the VNT table. If the flag is set as "0," the VNT index is skipped without being described.

PT indices are a list of indices indicating a multiplicity of parameters encompassed by one functional unit. The functional unit may have no parameter or multiple parameters. Presence or no presence of the parameter is indicated by the flag, and then a PT index that includes parameter information is described. Then, if all of the parameter information is completely described, "1" is set, and otherwise, that is, there is no more parameter information to write, "0" is set. Afterwards, the remaining parameter table indices are written in the same manner.

QID name indicates a string used as an appropriate identifier of a functional unit. Since not every functional unit has the QID name, whether the QID name is present or not is described in 1 bit. If the flag is set as "0," the QID is skipped without being described. If the flag is set as "1," the length of QID name is described in 8 bits. Thereafter, the English characters of QID name are written one by one. Each English character can be expressed in Ascii code.

The FUIT table is expressed in the following text form.

```
{
    (VNT Index, [Parent VNT Index], {PT Indexes}, [QID name] ),
    ...
}
```

An embodiment of the FUIT table for MPEG-4 SP that supports the XML format is as follows.

```
FUIT
{
    (1, 0, {21, 22, 23, 24, 25, 26, 27, 28, 29, 30, 31, 32, 33, 34, 35,
36, 37}, "mpeg4"),
    (2, 0, {21, 24, 25, 23, 26, 27, 28, 29, 33, 34, 39}, "mpeg4"),
    (3, 0, {21, 24, 25, 23, 26, 27, 28, 29, 33, 34, 39}, "mpeg4"),
    (3, 0, {21, 24, 25, 23, 26, 27, 28, 29, 33, 34, 39}, "mpeg4"),
    (4, 0, {38, 21, 40, 37, 49, 41, 7, 25, 26, 27, 29, 30, 35}, "mpeg4"),
    ...
    ...
    (24, 14, {52, 21, 24, 25, 23, 26, 27, 28, 29, 33, 34, 39}, "cal")
}
```

FIG. 15 shows the structure of the PT table in accordance with an embodiment of the present invention.

As illustrated in FIG. 15, the PT table includes Parameter name, Parent VNT index, ET index and TT index fields.

Although parameters are not syntax generated from a bitstream, parameters are used to generate data required for configuring a functional unit. Since parameters are not syntax, parameters can not be transferred through a port, which transmits data. In a network, which is a collection of functional units, parameters can be transferred to a lower level network that is included in the network. Information on the parameter that a functional unit has is described in a PT index in FUIT. PT has generation information of each parameter.

In Parameter name, each parameter basically has its name. The length of Parameter name is described in 8 bits. Thereafter, the English characters of Parameter name are written one by one. Each English character can be expressed in Ascii code.

In Parent VNT index, a parameter can be used in a higher level Network functional unit, which is the basic template, and can be used in a lower level functional unit object (instance) through the basic template. For a parameter that is used in a higher level Network, the flag is set as "1," and an index is described for referencing in the VNT table. If the parameter is used in a lower level object (instance), the flag is set as "0," and the VNT table index is not described.

In ET index, an expression indicating the form of a parameter can be made. If there is an expression for a parameter, the flag is set as "1," and if there is no expression for a parameter, the flag is set as "0." If the flag is set as "0," the ET index is skipped without being described. The details of the expression are referenced by the index of the ET.

TT index indicates the type of parameter (kind of parameter). If the flag indicating whether the type of parameter is present is set as "1," the TT index is described. Otherwise, the TT index is skipped without being described. The details of the type are referenced by the index of the TT.

The PT table is expressed in the following text form.

```
{
    (Parameter Name, [VNT Index], [Expr Index], [Type Index]),
    ...
}
```

An embodiment of the PT table for MPEG-4 SP that supports the XML format is as follows.

```
PT
{
//0
("MAXW_IN_MB", 0, 0, -),
("MAXH_IN_MB", 0, 1, -),
("ADDR_SZ", 0, 2, -),
("PIX_SZ", 0, 3, -),
("MV_SZ", 0, 3, -),
//5
("SAMPLE_COUNT_SZ", 0, 4, -),
("SAMPLE_SZ", 0, 5, -),
("MB_COORD_SZ", 0, 4, -),
("BTYPE_SZ", 0, 0, -),
("NEWVOP", 0, 6, -),
//10
("INTRA", 0, 7, -),
("INTER", 0, 8, -),
("QUANT_MASK", 0, 9, -),
("ROUND_TYPE", 0, 10, -),
("FCODE_MASK", 0, 11, -),
//15
("FCODE_SHIFT", 0, 12, -),
("ACPRED", 0, 13, -),
("ACCODED", 0, 14, -),
("FOURMV", 0, 15, -),
("MOTION", 0, 4, -),
//20
("QUANT_SZ", 0, 12, -),
("MAXW_IN_MB", -, 16, -),
("SAMPLE_COUNT_SZ", -, 17, -),
("SAMPLE_SZ", -, 18, -),
("MB_COORD_SZ", -, 19, -),
//25
("BTYPE_SZ", -, 20, -),
("NEWVOP", -, 21, -),
("INTRA", -, 22, -),
("INTER", -, 23, -),
("QUANT_MASK", -, 24, -),
//30
("ROUND_TYPE", -, 25, -),
("FCODE_MASK", -, 26, -),
("FCODE_SHIFT", -, 27, -),
("ACPRED", -, 28, -),
("ACCODED", -, 29, -),
//35
("MOTION", -, 30, -),
("FOURMV", -, 31, -),
("MV_SZ", -, 32, -),
("SEARCHWIN_IN_MB", -, 33, -),
("QUANT_SZ", -, 34, -),
//40
("MAXH_IN_MB", -, 35, -),
("PIX_SZ", -, 36, -),
("BUF_SZ", 4, 37, -),
("FLAG_SZ", 4, 15, -),
("BUF_SZ", 5, 37, -),
//45
("FLAG_SZ", 5, 15, -),
("BUF_SZ", 6, 37, -),
("FLAG_SZ", 6, 15, -),
("FLAG_SZ", -, 38, -),
("ADDR_SZ", -, 39, -),
//50
("BUF_SZ", -, 40, -),
("SEARCHWIN_IN_MB", -, 41, -),
("DCVAL", -, 7, -)
}
```

FIG. 16 shows the structure of the NCT table in accordance with an embodiment of the present invention.

As illustrated in FIG. 16, the NCT table includes Src FUIT index, Dst FUIT index, Src port name, Dst port name, Attribute name, Attribute value and ET Index fields.

NCT has information on ports, which are paths for getting data transferred among functional units. Each of input ports and output ports, which respectively handle input and output, can have its own unique name.

Src FUIT index must indicate where data comes from when the data is transmitted from one functional unit to another functional unit. The functional unit from which the data is transmitted can be referenced in an index of FUIT. If the beginning of a bitstream is not the functional unit itself, like an input file, "-" can be indicated. Therefore, whether the index references FUIT or not is indicated by the flag, and the FUIT index is written. If the flag is set as "0," the FUIT index is skipped without being described.

Dst FUIT index indicates the functional unit at which data arrives, and indicates the FUIT index of the functional unit at which the data arrives. If the beginning of a bitstream is not the functional unit itself, like an output file, "-" can be indicated. Therefore, whether the index references FUIT or not is indicated by the flag, and the FUIT index is written. If the flag is set as "0," the FUIT index is skipped without being described.

Src port name and Dst port name indicate names of ports through which data is transmitted. An output port of a functional unit becomes a source port of data transmission, and an input port of another functional unit becomes a destination port at which the data arrives. The names of the output port and input port through which the data is transmitted can be the same. Therefore, a same flag, which indicates whether the names of two transmission ports are identical or not, is described. If the same flag is set as "0," the Dst port name is not described. When Src port name and Dst port name are binarized and written in a bitstream, the string length of the name is described first (8 bits), and then the English characters are written one by one. Each English character can be expressed in Ascii code.

Attribute name can add connection attribute information with respect to the connection relation of the network. If a name of such attribute information is present, the flag is set as "1," and otherwise, the flag is set as "0." If the flag is set as "0," the attribute name is skipped without being described. When the name of connection attribute information is binarized and written in a bitstream, the string length of the name is described first (8 bits), and then the English characters are written one by one. Each English character can be expressed in Ascii code.

Attribute value can be described when the name of connection attribute information is present in the connection relation of the network. If the flag is set as "0," the attribute value is skipped without being described. Therefore, whether the attribute value is present or not is indicated by the flag, and the string length indicating the value is described in 8 bits. Thereafter, the English characters are written one by one. Each English character can be expressed in Ascii code.

In ET index, additional expression on the connection relation of the network can be made. If there is an additional expression, the flag is set as "1," and otherwise, the flag is set as "0." If the flag is set as "0," the ET index is skipped without being described. The details of the expression can be referenced by the index of ET.

The NCT table is expressed in the following text form.

```
{
    ([Src FUIT Index], [Dst FUIT Index], Src Port, Dst Port,
[Attribute Name], [Attribute Value], [Expr Index]),
    ...
}
```

An embodiment of the NCT table for MPEG-4 SP that supports the XML format is as follows.

```
NCT
{
//FUIT 0-7
(-, 7, "mpeg", "in8", -, -, -),
(7, 0, "out", "BITS", -, -, -),
(0, 1, "BTYPE_Y", "BTYPE", -, -, -),
(0, 1, "B_Y", "QFS", -, -, -),
(0, 2, "BTYPE_U", "BTYPE", -, -, -),
(0, 2, "B_U", "QFS", -, -, -),
(0, 3, "BTYPE_V", "BTYPE", -, -, -),
(0, 3, "B_V", "QFS", -, -, -),
(1, 4, "f", "TEX", -, -, -),
(2, 5, "f", "TEX", -, -, -),
(3, 6, "f", "TEX", -, -, -),
(0, 4, "MV_Y", "MV", -, -, -),
(0, 4, "BTYPE_Y", "BTYPE", -, -, -),
(0, 5, "MV_U", "MV", -, -, -),
(0, 5, "BTYPE_U", "BTYPE", -, -, -),
(0, 6, "MV_V", "MV", -, -, -),
(0, 6, "BTYPE_V", "BTYPE", -, -, -),
(4, -, "VID", "video_Y", -, -, -),
(5, -, "VID", "video_U", -, -, -),
(6, -, "VID", "video_V", -, -, -),
//FUIT 8 9 10 11
(-, 8, "MV", "MV", -, -, -),
(-, 8, "BTYPE", "BTYPE", -, -, -),
(-, 11, "TEX", "TEX", -, -, -),
(-, 11, "BTYPE", "BTYPE", -, -, -),
(8, 9, "WA", "WA", -, -, -),
(8, 9, "RA", "RA", -, -, -),
(8, 10, "halfpel", "halfpel", -, -, -),
(9, 10, "RD", "RD", -, -, -),
(10, 11, "MOT", "MOT", -, -, -),
(11, 9, "VID", "WD", -, -, -),
(11, -, "VID", "VID", -, -, -),
//FUIT 12 13 14 15
(-, 12, "MV", "MV", -, -, -),
(-, 12, "BTYPE", "BTYPE", -, -, -),
(-, 15, "TEX", "TEX", -, -, -),
(-, 15, "BTYPE", "BTYPE", -, -, -),
(12, 13, "WA", "WA", -, -, -),
(12, 13, "RA", "RA", -, -, -),
(12, 14, "halfpel", "halfpel", -, -, -),
(13, 14, "RD", "RD", -, -, -),
(14, 15, "MOT", "MOT", -, -, -),
(15, 13, "VID", "WD", -, -, -),
(15, -, "VID", "VID", -, -, -),
//FUIT 16 17 18 19
(-, 16, "MV", "MV", -, -, -),
(-, 16, "BTYPE", "BTYPE", -, -, -),
(-, 19, "TEX", "TEX", -, -, -),
(-, 19, "BTYPE", "BTYPE", -, -, -),
(16, 17, "WA", "WA", -, -, -),
(16, 17, "RA", "RA", -, -, -),
(16, 18, "halfpel", "halfpel", -, -, -),
(17, 18, "RD", "RD", -, -, -),
(18, 19, "MOT", "MOT", -, -, -),
(19, 17, "VID", "WD", -, -, -),
(19, -, "VID", "VID", -, -, -),
//FUIT 20 21 22 23 24 25
(-, 20, "QFS", "IN", -, -, -),
(20, 21, "DC", "QFS_DC", -, -, -),
(20, 22, "AC", "QFS_AC", -, -, -),
(-, 21, "BTYPE", "BTYPE", -, -, -),
(21, 22, "AC_PRED_DIR", "AC_PRED_DIR", -, -, -),
(22, 23, "PQF_AC", "PQF_AC", -, -, -),
(23, 24, "QF_AC", "QF_AC", -, -, -),
(24, 25, "OUT", "IN", -, -, -),
(21, 23, "PTR", "PTR", -, -, -),
(21, 23, "AC_PRED_DIR", "AC_PRED_DIR", -, -, -),
(21, 24, "QUANT", "QP", -, -, -),
(21, 24, "QF_DC", "DC", -, -, -),
(21, 25, "signed", "signed", -, -, -),
(25, -, "out", "f", -, -, -),
//FUIT 26 27 28 29 30 31
(-, 26, "QFS", "IN", -, -, -),
(26, 27, "DC", "QFS_DC", -, -, -),
(26, 28, "AC", "QFS_AC", -, -, -),
(-, 27, "BTYPE", "BTYPE", -, -, -),
(27, 28, "AC_PRED_DIR", "AC_PRED_DIR", -, -, -),
(28, 29, "PQF_AC", "PQF_AC", -, -, -),
(29, 30, "QF_AC", "QF_AC", -, -, -),
(30, 31, "OUT", "IN", -, -, -),
(27, 29, "PTR", "PTR", -, -, -),
(27, 29, "AC_PRED_DIR", "AC_PRED_DIR", -, -, -),
(27, 30, "QUANT", "QP", -, -, -),
(27, 30, "QF_DC", "DC", -, -, -),
(27, 31, "signed", "signed", -, -, -),
(31, -, "out", "f", -, -, -),
//FUIT 32 33
(-, 32, "BTYPE", "BTYPE", -, -, -),
(-, 33, "QFS_DC", "QFS_DC", -, -, -),
(-, 33, "BTYPE", "BTYPE", -, -, -),
(32, 33, "A", "A", -, -, -),
(32, 33, "B", "B", -, -, -),
(32, 33, "C", "C", -, -, -),
(33, -, "PTR", "PTR", -, -, -),
(33, -, "AC_PRED_DIR", "AC_PRED_DIR", -, -, -),
```

-continued

```
(33, -, "SIGNED", "SIGNED", -, -, -),
(33, -, "QF_DC", "QF_DC", -, -, -),
(33, -, "QUANT", "QUANT", -, -, -),
//FUIT 34 35
(-, 34, "BTYPE", "BTYPE", -, -, -),
(-, 35, "QFS_DC", "QFS_DC", -, -, -),
(-, 35, "BTYPE", "BTYPE", -, -, -),
(34, 35, "A", "A", -, -, -),
(34, 35, "B", "B", -, -, -),
(34, 35, "C", "C", -, -, -),
(35, -, "PTR", "PTR", -, -, -),
(35, -, "AC_PRED_DIR", "AC_PRED_DIR", -, -, -),
(35, -, "SIGNED", "SIGNED", -, -, -),
(35, -, "QF_DC", "QF_DC", -, -, -),
(35, -, "QUANT", "QUANT", -, -, -)
}
```

FIG. 17 shows the structure of the ET table in accordance with an embodiment of the present invention.

As illustrated in FIG. 17, the ET table includes Kind, Literal kind, Literal value, Variable name, Operator, Child ET index and Args ET index fields.

ET table is not information obtained from a bitstream but a table referenced for expression of syntax. The ET table is described to indicate certain mathematical expression or information for expression. This table indicates the kinds and values of expression techniques, the name of variables, etc. that are used in the expression.

Kind refers to the kind indicated by the expression. This field is described in 3 bits in a bitstream. There are 5 kinds of expressions, as shown in the table below.

TABLE 2

| Kind | Code |
| --- | --- |
| Literal | 000 |
| Var | 001 |
| Application | 010 |
| UnaryOp | 011 |
| BinOpSeq | 100 |
| Reserved | 101-111 |

Literal kind indicates the kind that Literal can have only when a value of a previous Kind field is designated as Literal. If the flag is set as "0," the Literal kind is skipped without being described. The Literal kind has the following kinds of codes, as shown in the table below.

TABLE 3

| Literal kind | Code |
| --- | --- |
| Boolean | 000 |
| Integer | 001 |
| Real | 010 |
| String | 011 |
| Character | 100 |
| Reserved | 101-111 |

Literal value indicates a value that Literal has when a value of a previous Kind field is designated as Literal. If the flag is set as "0," the Literal value is skipped without being described. If the flag is set as "1," the length of Literal value is described in 8 bits. Thereafter, the English characters of Literal value are written one by one. Each English character can be expressed in Ascii code.

Variable name indicates the name of Variable when a value of a previous Kind field is designated as Var. If the flag is set as "0," the Variable name is skipped without being described.

If the flag is set as "1," the length of Variable name is described in 8 bits. Thereafter, the English characters of Variable name are written one by one. Each English character can be expressed in Ascii code.

Operator indicates the operator when the expression indicates an operation. If the flag is set as "0," the Operator is skipped without being described. If the flag is set as "1," the length of Operator is described in 8 bits. Thereafter, the English characters of Operator are written one by one. Each English character can be expressed in Ascii code.

Child ET index can describe a lower level expression in case the expression includes another expression. If the flag is set as "0," the ET index on the lower level expression is skipped without being described. If the flag is set as "1," the ET index indicating the lower level expression is written in 8 bits.

Args ET index can indicate the description on a factor with the ET index in case the expression includes the factor. If the flag is set as "0," the ET index for expressing the factor is skipped without being described. If the flag is set as "1," the ET index for expressing the factor is written in 8 bits.

The ET table is expressed in the following text form.

```
{
    (Kind, [Literal-Kind], [value], [name], [Op],
    [Child-Expr(ET No.)] [Args-Expr(ET No.)]),
    ...
}
```

An embodiment of the ET table for MPEG-4 SP that supports the XML format is as follows.

```
ET
{
//0
("Literal", "Integer", "12", -, -, -, -),
("Literal", "Integer", "10", -, -, -, -),
("Literal", "Integer", "20", -, -, -, -),
("Literal", "Integer", "9", -, -, -, -),
("Literal", "Integer", "8", -, -, -, -),
//5
("Literal", "Integer", "13", -, -, -, -),
("Literal", "Integer", "2048", -, -, -, -),
("Literal", "Integer", "1024", -, -, -, -),
("Literal", "Integer", "512", -, -, -, -),
("Literal", "Integer", "31", -, -, -, -),
//10
("Literal", "Integer", "32", -, -, -, -),
("Literal", "Integer", "448", -, -, -, -),
("Literal", "Integer", "6", -, -, -, -),
("Literal", "Integer", "1", -, -, -, -),
("Literal", "Integer", "2", -, -, -, -),
//15
("Literal", "Integer", "4", -, -, -, -),
("Var", -, -, "MAXW_IN_MB", -, -, -),
("Var", -, -, "SAMPLE_COUNT_SZ", -, -, -),
("Var", -, -, "SAMPLE_SZ", -, -, -),
("Var", -, -, "MB_COORD_SZ", -, -, -),
//20
("Var", -, -, "BTYPE_SZ", -, -, -),
("Var", -, -, "NEWVOP", -, -, -),
("Var", -, -, "INTRA", -, -, -),
("Var", -, -, "INTER", -, -, -),
("Var", -, -, "QUANT_MASK", -, -, -),
//25
("Var", -, -, "ROUND_TYPE", -, -, -),
("Var", -, -, "FCODE_MASK", -, -, -),
("Var", -, -, "FCODE_SHIFT", -, -, -),
("Var", -, -, "ACPRED", -, -, -),
("Var", -, -, "ACCODED", -, -, -),
//30
("Var", -, -, "MOTION", -, -, -),
```

```
("Var", -, -, "FOURMV", -, -, -),
("Var", -, -, "MV_SZ", -, -, -),
("Literal", "Integer", "3", -, -, -, -),
("Var", -, -, "QUANT_SZ", -, -, -),
//35
("Var", -, -, "MAXH_IN_MB", -, -, -),
("Var", -, -, "PIX_SZ", -, -, -),
("Literal", "Integer", "...", -, -, -, -),
("Var", -, -, "FLAG_SZ", -, -, -),
("Var", -, -, "ADDR_SZ", -, -, -),
//40
("Var", -, -, "BUF_SZ", -, -, -),
("Var", -, -, "SEARCHWIN_IN_MB", -, -, -)
}
```

Type Table (TT) includes Type Name, Entry Name, Expr index and Type index fields.

Hereinafter, the syntax parsing table will be described.

In CSCIT, detailed information on element information (e.g., CSCI), which is result information of a process in which a parsing functional unit has used SET and SRT, is described. That is, CSCIT has information on all meaningful data (i.e., element information) that are processed from the existing bitstream and stored in a CSCI storage unit and will be used by decoding functional units. CSCIT is a unique number of the pertinent element information and includes, as identifiers, an index (C), a flag, an element name, an attribute for designating data structural properties of the pertinent element information (e.g., size of storage space of the pertinent element information, whether the pertinent element information is an array, etc.), and global/local that indicates whether the pertinent element information is used in syntax parsing only or in the entire decoding process. Not only can CSCIT be described in a technological method such as textual description or binary description (a bit-transformed binary code form), but the minimal data required for the above partial decoder description can be described in a similar script language.

SET is a decoder description that is constituted by information on syntax of the inputted existing bitstream. SET includes information on index, element name, parameter and process by SET-PROC for each of the syntax. Here, the index is an identifier (S) that distinguishes each of the syntax that is used in SRT. The element name is the name of syntax, and can be named according to the meaning or role of the syntax. The parameter is provided as a factor value when the parsing process described in SRT calls a parsing algorithm of SET, and the factor value can be a value calculated from a fixed constant number or bitstream or an identifier of buffer space (e.g., CSCI memory) for storing data derived during the parsing process. The factor value transferred through a parameter is distinguished through the index (P), and each factor value is element information (that is, CSCI information (C)) and can be used when the obtained data is stored. In case the pertinent element information is needed as data during a process later, the pertinent information can be read again by using the parameter index (P). Also, the parameter can indicate a constant value as well as the CSCI information (C) according to the designation by SRT. The process by SET-PROC describes which process the inputted bitstream syntax will be taken to generate the output data of element information.

Not only can SET be described in a technological method such as textual description or binary description (a bit-transformed binary code form), but the minimal data required for the above partial decoder description can be described in a similar script language.

Next, STR indicates connection information between each of the syntax in the existing bitstream. In other words, SRT has information that calls and instructs each of the syntax to move to a next syntax. The parsing functional unit uses SRT to read the existing bitstream or define the order of storing and/or renewing the element information in the CSCI storage unit.

SRT includes information on index (R), parameter (P) and rule.

Index (R) distinguishes each of the connection information (Rule). Since the index (S) of syntax designates the syntax to process in a particular connection index, the parsing functional unit (or functional units that carry out syntax parsing) uses SET to carry out a process designated for the pertinent syntax. The parameter is provided as a factor value when a parsing process described in SRT calls a parsing algorithm of another SRT to a hierarchically-lower level, and this factor value can be a value calculated form a fixed constant number or bitstream or an identifier of buffer space (e.g. CSCI memory) for storing data derived in the parsing process. The factor value transferred through a parameter is distinguished through the index (P), and each factor value can be used when the obtained data is stored. In case the pertinent element information is needed as data during a process later, the pertinent information can be read again by using the parameter index (P). Also, the parameter can indicate a constant value as well as the CSCI information (C) according to the designation by SRT. The rule information, which describes the process of parsing, can use control syntax such as branch and repeat, and can process syntax parsing by calling an element of another SRT or SET to a lower level.

Input data indicates a list of element information to be used for determining the conditions for connection control in the pertinent connection index.

The number of branches is the number of cases that can be connected to a following syntax, and indicates the total number of branching paths that the pertinent connection index has. Branching information, which is present as #1, #2, #3, etc. in the same number of branches, is a condition determining algorithm that determines the next connection index to process. The branching information can help to directly determine which information to read in which order. If the number of branches is 1, there is no input data, and the connection index designated in the branching information is immediately processed. However, if the number of branches is 2 or more, the condition is determined (after a conditional statement, next connection information (R) is constituted), and a corresponding connection index is processed.

The parsing functional unit processes the syntax defined in the pertinent connection index and renews the CSCI storage unit, and then references and reads element information of the renewed CSCI storage unit and utilizes the element information for determining the branching condition. For example, in C0=1, which is the branching condition of the branching information of the index R0, C0 is the element information C0 after processing the syntax S0.

Not only can SRT be described in a technological method such as textual description or binary description (a bit-transformed binary code form), but the minimal data required for the above partial decoder description can be described in a similar script language.

Lastly, DVT is a decoder description in which Huffman table information used in each encoder/decoder is written. In MPEG-1/2/4/AVC, entropy coding is performed for each encoding. The information used for the Huffman coding method, which is commonly used in this entropy coding, is the Huffman table. In order to realize a unified codec, the Huffman table that is to be used for decoding by a pertinent decoder needs to be provided. Therefore, the Huffman table information corresponding to each of the syntax for syntax parsing is included in the decoding description according to the present invention. Of course, in case the Huffman table information corresponding to each standard is already written in a description storage unit, transmission of DVT can be omitted, or a codec #1120 and a profile and level #1130 can be only included.

DVT includes a name for each Huffman table, an actual value compressed and outputted by Huffman coding, and a code value used when the compressed actual value is stored in an existing bitstream. For example, if the actual value of 3 is obtained by compressing an MCBPC value, the code value of 011 is written in the existing bitstream 316 by Huffman table mapping (e.g. the PROCESS portion of SET). In another example, as VLD[1] is written in the Process portion of the index S77 of the earlier-illustrated SET, the mathematical function VLD is called. After obtaining the code value by reading the existing bitstream 316, of which the length (fixed length or variable length) is predetermined by this mathematical function, the corresponding actual value can be obtained by the Huffman table mapping. Here, the Huffman table used is [1], that is, CBPY, which is the first table.

Not only can DVT be described in a technological method such as textual description or binary description (a bit-transformed binary code form), but the minimal data required for the above partial decoder description can be described in a similar script language.

For example, DVT can have the following textual description.

DVT{((0,1), (1,001), (2,010), (3,011), (4,0001), (5,000001), (6,000010), (7,000011), (8,000000001), (9,NULL)) ((0,0011), (1,00101), (2,00100), (3,1001), (4,00011), (5,0111), (6,000010), (7,1011), (8,00010), (9,000011), (10,0101), (11,1010), (12,0100), (13,1000), (14, 0110), (15,11), (16,000000), (17,000001), (18,NULL)) ((0, 011), (1,11), (2,10), (3,010), (4,001), (5,0001), (6,00001), (7,000001), (8,0000001), (9,00000001), (10,000000001), (11,0000000001), (12,00000000001), (13,NULL)) ((0,11), (1,10), (2,01), (3,001), (4,0001), (5,00001), (6,000001), (7,0000001), (8,00000001), (9,000000001), (10,0000000001), (11,00000000001), (12,000000000001), (13,NULL)) . . . .

In another example, DVT can have the following binary description.

00000011111111111111111111111111011111100001100 01100100011010000110110010000010011000000100 11000000100011000001101001000000001000001111110010 00011001010010100101001000010010010010100011001 00011100110000010001001011001010001000110000011 00100010100100101000100010000100100000100011000 10110011000000000110000001000001111100011011000 10110001010000110100001100100100000100101000 10011000000100111000000101000000000010100100000 000101010000000001010110000000000100000111111 000101100010100001001000110010010000010001010000 1001100000010 . . . .

As described above, the decoding process in the decoder according to the present invention is basically carried out using an XML-based decoder description, i.e. a BSDL-based decoder description. Meanwhile, as described through the second embodiment, even if a CDDL-based decoder description compressed in a binary form is inputted, the CDDL-based decoder description can be converted to an XML-based (BSDL-based) decoder description and processed.

The BSDL-based DD is considered an appropriate method for a developer who is seeking to implement variously based on the DD because of its high readability. However, since the XML-based BSDL format does not have a compression function in itself, it can be inefficient in an environment that requires real-time transmission due to its size. Therefore, by expressing the BSDL using the CDDL format that expresses the same process using less size, as in the above-described second embodiment of the present invention, a compression effect required by the real-time environment can be achieved.

In order to transform different types of DDs, such as CDDL and BSDL, to a mutual method, a bitstream syntax list can be utilized as an intermediate form. This list is provided in an identical or similar form as provided by the standard specification document, and indicates the details and bit lengths of various syntax information once an image bitstream is built in according to the specifications. Since it is apparent that every type of DD format is written pursuant to the specifications defined in the standard, different kinds of DDs can be transformed more easily by extracting the information in the form of the standard specification document.

Figure 18:
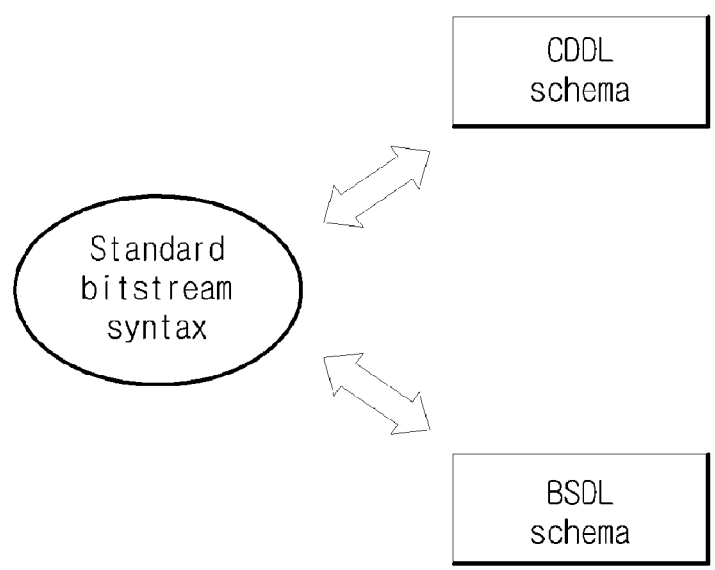
FIG. 18 illustrates a transform relation between CDDL and BSDL using a bitstream syntax list.

FIG. 18 illustrates a transform relation between CDDL and BSDL using the bitstream syntax list.

In order to extract syntax information from CDDL, simple rules as shown below can be applied to the CDDL-based DD.

1. Read syntax information of SRT.

A. Lower level SRT element call (Rn( );): Defined as a lower level syntax element group call on a bitstream.

B. SET element call (Sn( );): Determined as each individual syntax element.

C. Branch and repeat statement: Conditions kept on the list.

2. Read the SET element and identify bitstream-related syntax.

A. READ command: Determined as a syntax element with a fixed bit length. The length of a bit being read conforms to how it is defined in the pertinent element or defined by a higher level SRT command that calls the pertinent element. If a Byte-align parameter is used, the pertinent syntax is regarded as a start/end code.

B. SEEK command: When be followed by IF condition in parent SRT element, it will be considered as nextbits( ) function.

C. In case a branch/repeat statement is included: Determined as a syntax element with a variable length.

D. In case a VLD (Huffman/Golomb . . . ) command is used: Determined as a syntax element with a variable length.

E. In case a number of other commands are combined: Determined as a syntax element with a variable length.

F. In case there is no READ/SEEK/VLD command for reading the bitstream: The SET element is considered to be unrelated to the configuration of bitstream and thus is neglected in the process.

3. All CSCI elements are regarded as the space for storing individual syntax information that appears on the bitstream.

By applying the above rules, the CDDL syntax shown in Table 4 below can be transformed to XML syntax as follows.

TABLE 4

| Element name | Mnemonic | Bits |
| --- | --- | --- |
| do { | | |
| CSCI 0 | bslbf | 32 bit |
| CSCI 1 | uimsbf | 8 bit |
| while (next bits( )==00 00 01 B2) { | | |
| R3( ); | | |
| } | | |
| R1( ); | | |
| } while (next_bits( )==433) { | | |
| CSCI 2 | bslbf | 32 bit |

```
SET
{   ("READ P1 > P2;"),
    ("READ P1 B > P2;"),
    ("SEEK P1 > P2;"),
    ("SEEK P1 B > P2;")
}
SRT
{("
do {
    S1(32, C0);
    S0(8, C1);
    S3(32,V0);
    while(V0==434){
        R3( );
        S3(32,V0);
    }
    R1( );
    S3(32,V0);
}while(V0!=433);
S1(32, C2);
")}
```

Although a decoding apparatus and a method of analyzing syntax for decoding a bitstream in accordance with the present invention have been described for MPEG-4, it shall be apparent that the same can be equivalently applied, without any restriction, to MPEG-1, MPEG-2 and other video encoding/decoding standards.

Moreover, it shall be apparent that the information included in each decoder description is described not only as information on a connection relation between functional units and on a process required for the pertinent functional unit for carrying out the decoding based on one standard but also as information for carrying out the decoding based on a plurality of standards.

For example, in case it is assumed that the first several frames of encoded video data included in an extended bitstream are encoded in MPEG2, the following several frames in MPEG-4, and the remaining frames in MPEG-1, it shall be apparent that the decoder description information included in the decoder description will be implemented for the decoding of the encoded video data in such a way that the functional units, which are included in the tool box 510 based on their respective standards, of the differently-encoded frames can be organically combined and operated.

In order to load and reconfigure pertinent functional units and form the decoder in the decoding process described above, a mechanism that can identify and load the functional units quickly and efficiently is needed. Hereinafter, a method of specifically identifying FUs and a detailed structure of a tool box will be described.

Figure 19:
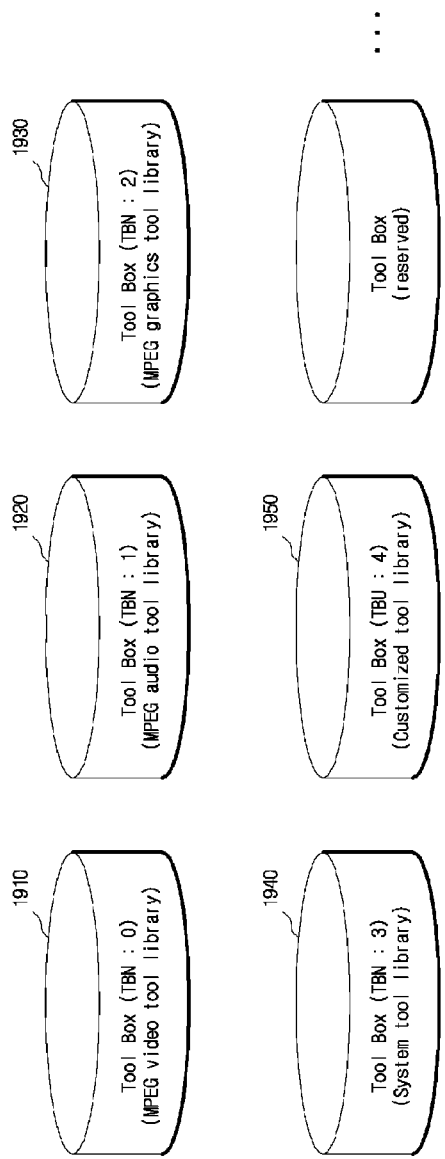
FIG. 19 shows an example of the detailed configuration of a tool box in accordance with an embodiment of the present invention.

FIG. 19 shows an example of the detailed configuration of a tool box in accordance with an embodiment of the present invention.

As illustrated in FIG. 19, a tool box in accordance with the present invention can be constituted with a group of a plurality of tool boxes that are separately classified in order to store/manage a plurality of functional units according to their types. Hereinafter, the group of a plurality of tool boxes will be referred to as a tool box unit. In other words, the functional units are stored/managed by being classified in a plurality of tool boxes in the tool box unit according to their types, and each tool box is identified and managed with a tool box number (TBN). That is, the TBN is a kind of tool box identification.

Specifically, the tool box unit according to the present invention can be constituted with functional units that are related to multimedia decoding, such as an MPEG video tool box that stores functional units related to MPEG video decoding, an MPEG audio tool box that stores functional units related to MPEG audio decoding, an MPEG graphics tool box that stores functional units related to MPEG graphics decoding, and a System tool box that stores functional units related to system decoding, and can further include a Customized tool box that stores Customized functional units that are defined by the user. While the present embodiment describes an example of functional units based on MPEG standardized format and functional units defined by the user, it shall be appreciated that the present invention is not restricted to MPEG encoded format but can be freely applied to various encoded formats.

The tool box numbers of the tool box unit can be defined as illustrated in the below table.

TABLE 5

| Tool Box Number (TBN) | Toolbox |
| --- | --- |
| 0 | MPEG video toolbox |
| 1 | MPEG audio toolbox |
| 2 | MPEG graphics toolbox |
| 3 | System toolbox |
| 4 | Customized toolbox |
| 5 | Reserved |
| . . . | . . . |
| n | Reserved |

The tool box unit and tool boxes can be realized by being logically classified in one storage means or can be realized by being physically classified in a plurality of storage means.

Figure 20:
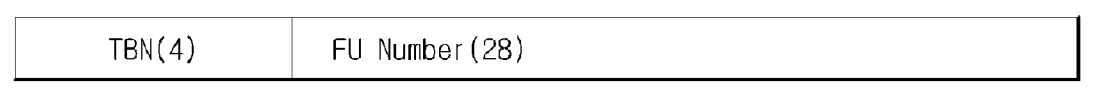

FIG. 20 shows an example of functional unit identification (FUID) in accordance with an embodiment of the present invention.

As illustrated in FIG. 20, the FUID in accordance with the present invention is constituted by including a TBN field, which indicates the tool box to which the pertinent functional unit belongs, and an FU Number field, which indicates the identification information of the pertinent functional unit.

The TBN field can be realized with 4 bits, and the FU Number field can be realized with 28 bits. By realizing the FU Number field with 28 bits, a total of 268,435,456 functional units can be stored, identified and used in one tool box.

The FUID can be expressed by being included in a decoder description by, for example, being applied in the FUID field in the earlier-described VNT. It shall be also appreciated that the FUID can be used to refer to each functional unit that is used for configuring the decoder, in the XML-based connection control information that encompasses the information having the same meaning.

Figure 21:
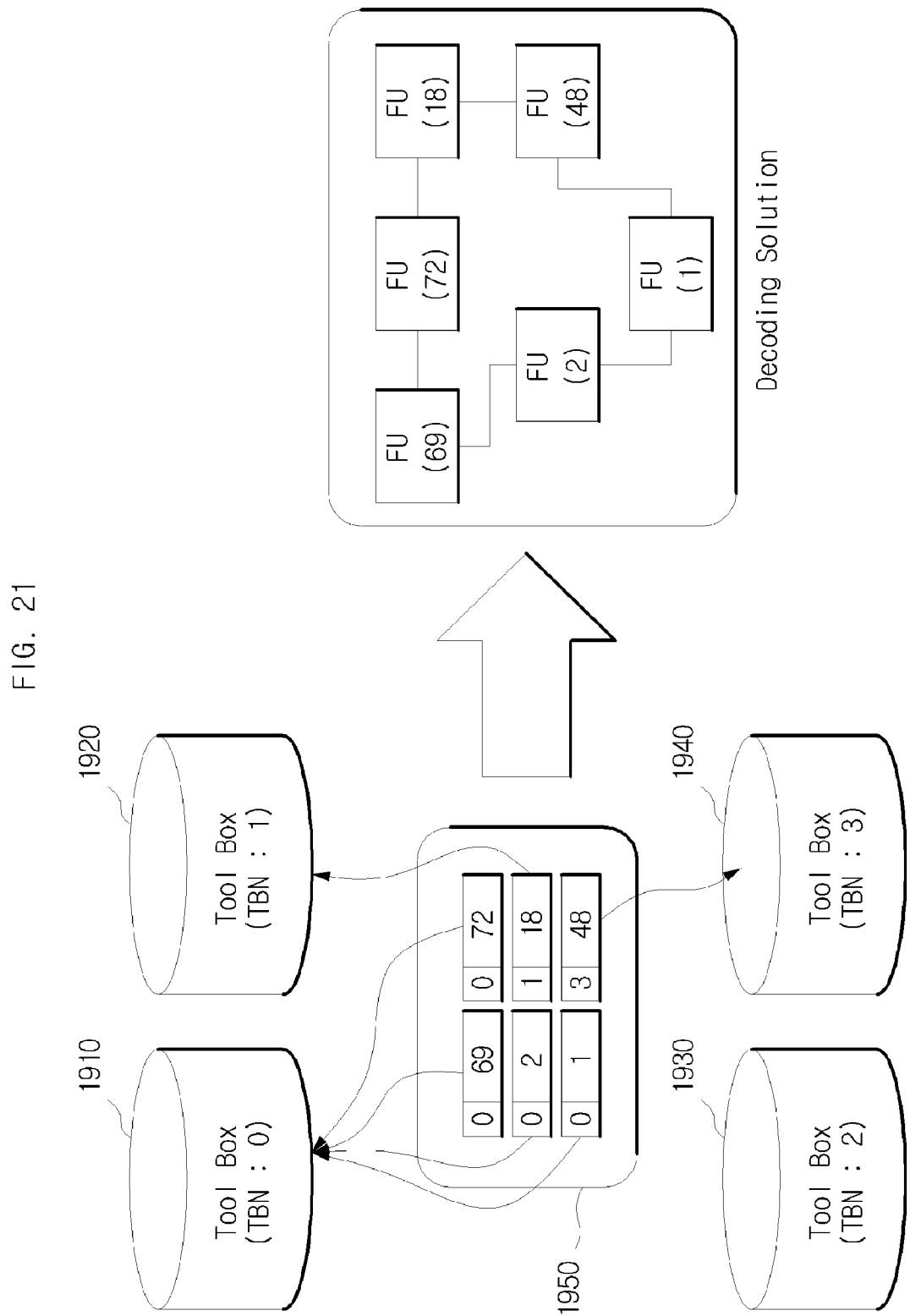
FIG. 21 is a conceptual diagram for illustrating a FU sorting/identifying mechanism in accordance with the present invention.

FIG. 21 is a conceptual diagram for illustrating a FU sorting/identifying mechanism in accordance with the present invention.

Referring to FIG. 21, the BSDL parser or the decoder description analyzing unit of the decoding unit analyzes the received decoder description to extract FUID 1950, and the decoder forming unit reads the TBNs and FU Numbers of functional units required for configuring the decoder from the FUID 1950. When the functional units corresponding to the read TBNs and FU Numbers are requested to the pertinent tool box, the requested functional units are loaded and connected to the decoding solution to form a reconfigured decoder and decode the inputted data.

For example, since the TBN is "0" and the FU Number is "69" for the first FUID, the functional unit of which the FU Number is "69" is requested and loaded among the functional units stored in the MPGE video tool box 1910 inside the tool box.

The decoding apparatus in accordance with the present invention requires a bitstream syntax parser for reading various kinds of bitstreams and an FU for decoding each of the data, in order to decode bitstreams based on various codecs.

The bitstream can be usually processed in a decoding apparatus by simply sending supplementary information such as decoder description because most bitstream types can be generally processed by simply adjusting the order and length of a syntax element. However, if the FU corresponding to a particular function used for encoding the video in an encoding apparatus is not present in the decoding apparatus, decoding of the particular bitstream is not possible. This problem can easily occur when a customized codec, which is not restricted by MPEG, is used.

To solve the above problem, the present invention defines a mechanism that transfers an FU to the decoding apparatus. Described hereinafter are other embodiments in which an encoding apparatus transmits an FU required for decoding data that is encoded in the encoding apparatus and a decoding apparatus receives and processes the FU.

Figure 22:
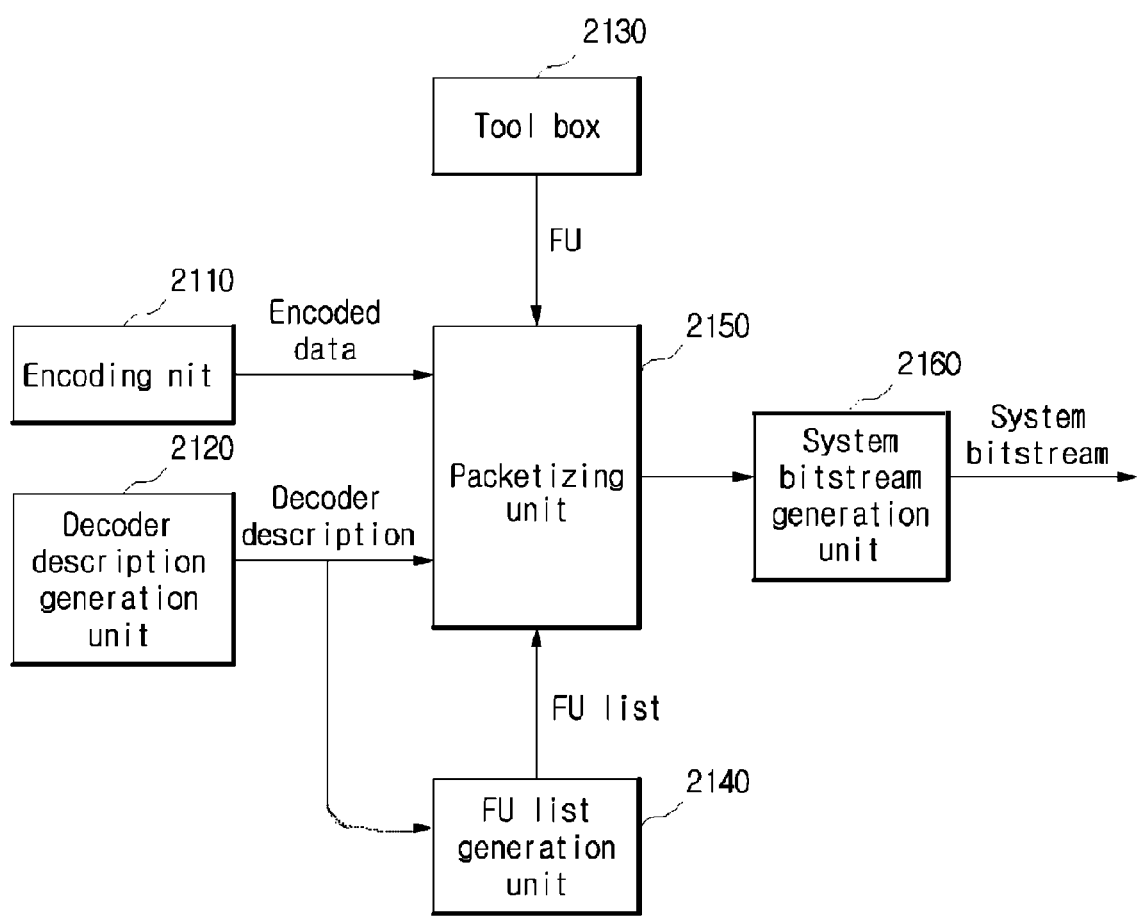
FIG. 22 is an encoding apparatus in accordance with yet another embodiment of the present invention.
Figure 23:
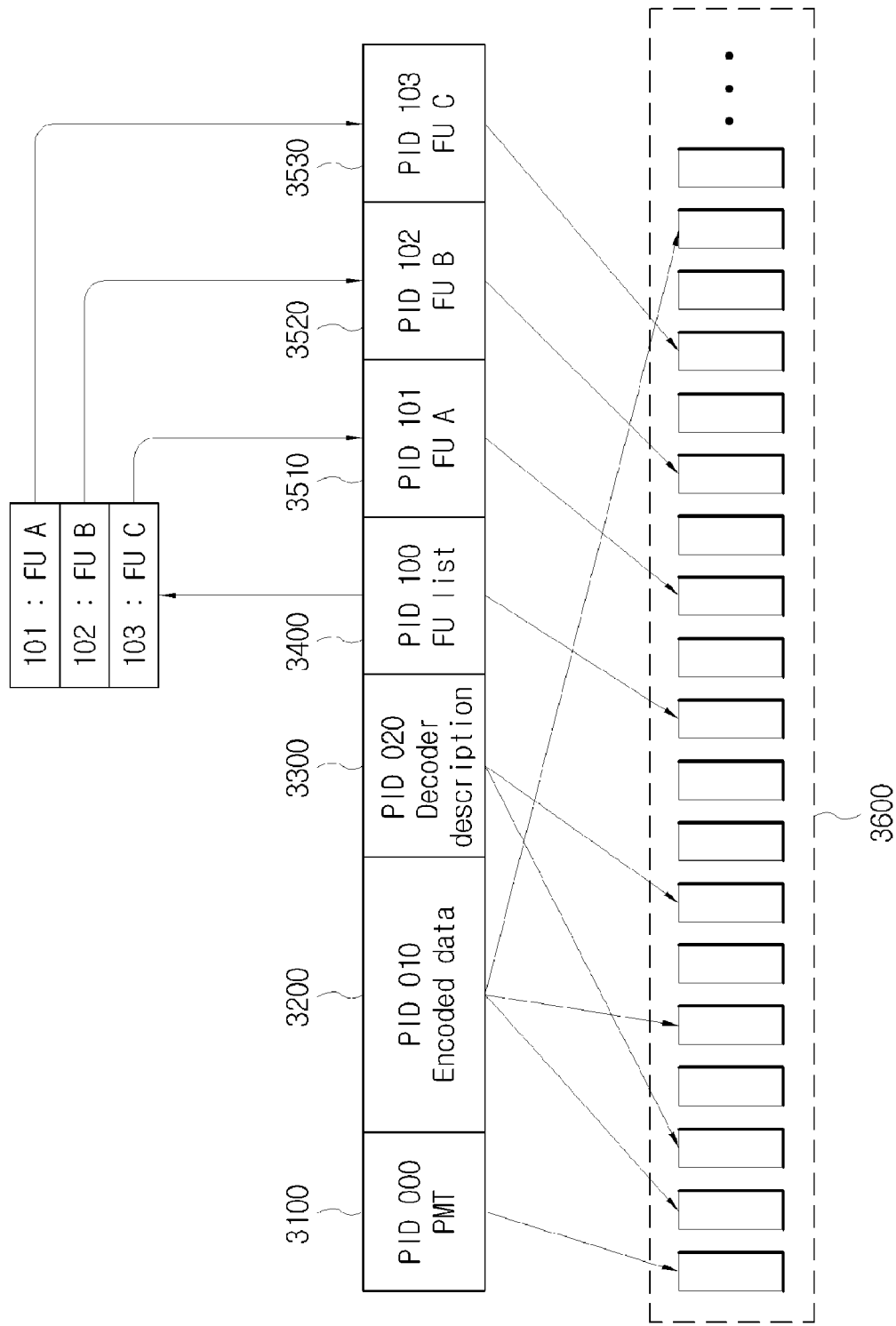
FIG. 23 shows an example of the configuration of packets of a transmitted bitstream in accordance with yet another embodiment of the present invention.

FIG. 22 is an encoding apparatus in accordance with yet another embodiment of the present invention, and FIG. 23 shows an example of the configuration of packets of a transmitted bitstream in accordance with yet another embodiment of the present invention.

As illustrated in FIG. 22, a decoding apparatus in accordance with yet another embodiment of the present invention can be constituted by including: an encoding unit 2110 that encodes video, audio or multimedia data to be transmitted and generates encoded data; a decoder description generation unit 2120 that generates a decoder description that describes the functional units constituting a decoder for decoding the encoded data and their connection relations; an FU list generation unit 2140 that receives the decoder description and generates and outputs an FU list, which is information on FUs required for decoding the encoded data; a tool box 2130 that stores the FUs; a packetizing unit 2150 that receives the encoded data and receives, packetizes and outputs the decoder description, FU list and FUs corresponding to the received encoded data; a system bitstream generation unit 2160 that combines and generates packets outputted from the packetizing unit to a system bitstream; and a transmitting unit (not shown) that transmits the system bitstream.

Applied for the encoding unit 2110 can be the conventional standard encoder, such as the encoder described with reference to FIG. 2, as well as a non-standard encoder that is newly defined by the user.

The decoder description generation unit 2120 describes FUID list and a connection relation of the functional units, input data of the functional units, syntax information and syntax connection information about the functional units required for constituting the decoder that can decode the encoded data. The FUID is constituted with the TBN field, which indicates the tool box to which the pertinent functional unit belongs in the tool box unit, and the FU Number field, which indicates the identification information of the pertinent functional unit The overall constitution of the tool box 2130 is identical to what is described with reference to FIG. 19. Summarizing the technical gist of the tool box 2130, the tool box is constituted with a tool box unit, which is a group of a plurality of tool boxes that are separately classified in order to store/manage a plurality of functional units according to their types, and the functional units are stored/managed by being classified in a plurality of tool boxes in the tool box unit according to their types, and each tool box is identified and managed with a tool box number (TBN). The TBN is a kind of tool box identification.

The packetizing unit 2150 is inputted with encoded data and the decoder description and FUs corresponding to the encoded data, and packetizes each of the encoded data, the decoder description and FUs by assigning separate packet ID (PID). Referring to FIG. 23, the packets generated by the packetizing unit 2150 include an encoded data packet 3200, a decoder description packet 3300, an FU list packet 3400 and FU packets 3510, 3520, 3530, etc.

The packetizing unit 2150 packetizes the inputted encoded data to an encoded packet 3200 by assigning a predetermined packet ID "PID 010," and packetizes the inputted decoder description to a decoder description packet 3300 by assigning a predetermined packet ID "PID 020."

The FU can be realized in a program syntax, in which case the data size of the FU is considered in the present embodiment and the FU is separated from an FU list header and sent as separate data. In other words, the FUs 3510, 3520, 3530 corresponding to the encoded data are respectively assigned with packet IDs "PID 101," "PID 102" and "PID 103," and the FU list is assigned with a separate packet ID 100 and is packetized to the FU list packet 3400. The FU list packet includes the FUID and the packet ID for FUs constituting the decoder that can decode the encoded data.

The system bitstream generation unit 2160 is inputted with the packets generated by the packetizing unit and combines and generates the packets to a system bitstream 3600, which is a bitstream for transmission. In order to distinguish the bitstream of the present embodiment, which also includes the FU information (FU list packet and FU packet) in addition to the encoded data and decoder description, from the extended bitstream, which is described earlier, the bitstream of the present embodiment is referred to as the system bitstream 3600.

As described above, data packets within the system bitstream in accordance with the present embodiment are identified using identification information referred to as packet ID (PID). Selectively accessing different kinds of packets that are present inside a broadcast bitstream based on PID has been widely used in conventional multi-channel identification and identification of voice stream in multi-voice broadcast.

By utilizing this method, the FU list and FUs, which are being transmitted, can be separated, and the list of FUs that are not present in the receiving side can be easily made by comparing the list of FUs that are in the receiving side and the transmitted list of FUs.

Figure 24:
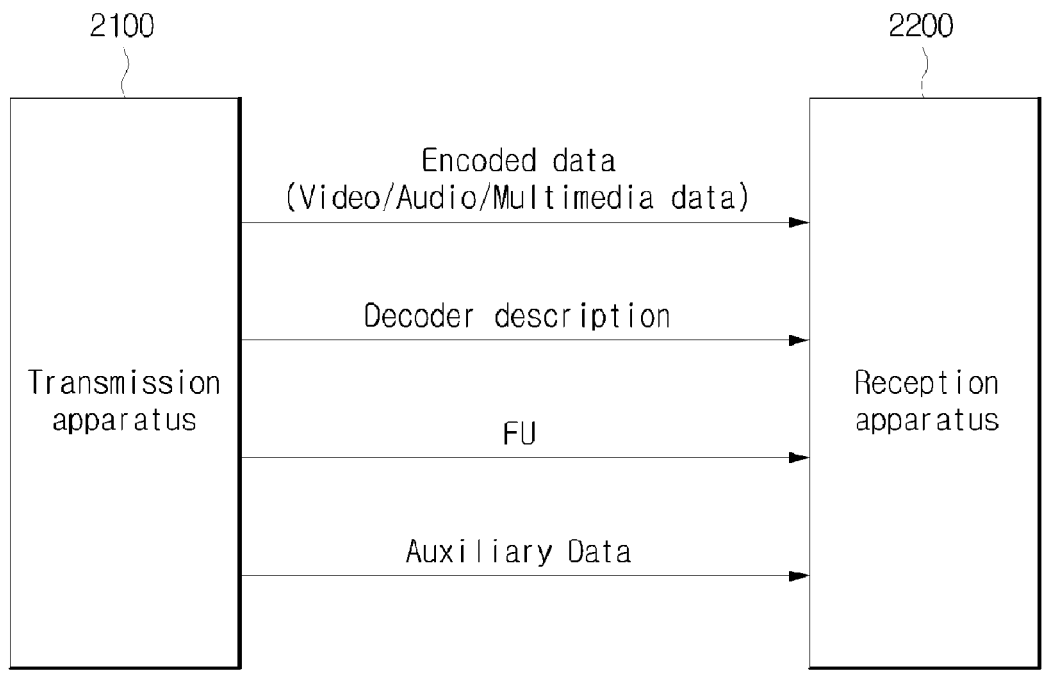
FIG. 24 is a conceptual illustration of how data is communicated in a broadcasting environment in accordance with yet another embodiment of the present invention.

FIG. 24 is a conceptual illustration of how data is communicated in a broadcasting environment in accordance with yet another embodiment of the present invention.

As illustrated in FIG. 24, when an encoding apparatus and a decoding apparatus in accordance with yet another embodiment of the present invention are applied to a broadcasting environment, a transmission apparatus 2100 that includes the encoding apparatus in accordance with yet another embodiment of the present invention transmits a broadcast bitstream that includes encoded data, in which video, audio and multimedia data are encoded, decoder description, FU and auxiliary data to a reception apparatus 2200 that includes the decoding apparatus in accordance with yet another embodiment of the present invention.

In the one-way broadcasting environment, it is not possible to verify whether the FU required for decoding is present in the receiving apparatus, and thus the FU can be periodically transmitted as a part of the broadcast bitstream. The FU is periodically transmitted because it is not certain which point of the video bitstream will be connected since a receiver of the broadcasting can connect to the broadcasting service at any time.

Figure 25:
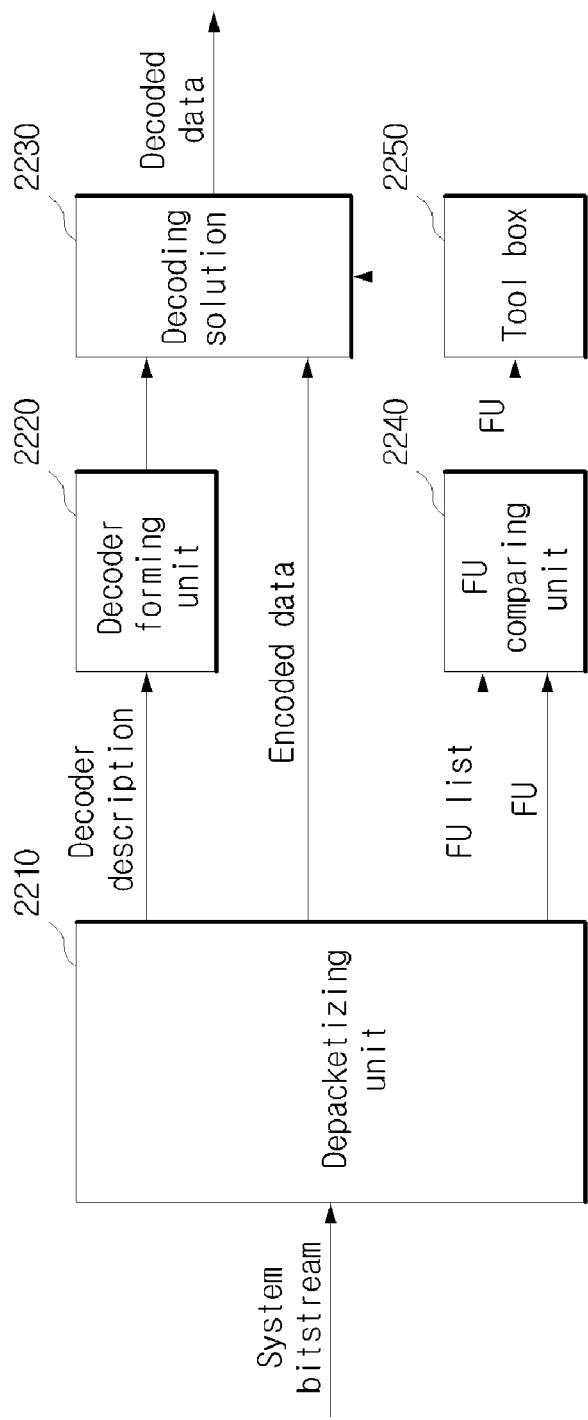
FIG. 25 is a decoding apparatus in accordance with yet another embodiment of the present invention.

FIG. 25 is a decoding apparatus in accordance with yet another embodiment of the present invention.

As illustrated in FIG. 25, the decoding apparatus in accordance with yet another embodiment of the present invention includes a depacketizing unit 2210, a decoder forming unit 2220, a decoding solution 2230, an FU comparing unit 2240 and a tool box 2250.

The depacketizing unit 2210 is inputted with the received bitstreams and separates the bitstreams according to their packet types and then outputs the encoded data, decoder description, FU list and FUs.

The FU comparing unit 2240 is inputted with the FU list from the depacketizing unit 2210, extracts FUID of the inputted FU list, and determines whether a new FU is received by comparing the FUID of the inputted FU list with FUID of FUs stored in the tool box 2250. If it is determined that a new FU is received, the FU is inputted from the depacketizing unit 2210 and transfers the FU to the tool box, allowing the tool box 2250 to store the new FU. In the meantime, the FU comparing unit 2240 ignores the FUs that are already stored in the tool box, thereby minimizing the processing time.

The decoder forming unit 2220 is inputted with and analyzes decoder description and loads and configures the FUs required for decoding the encoded data from the tool box 2250 to the decoding solution 2230 to form the reconfigured decoder.

The decoding solution 2230 is inputted with the encoded data and decodes and outputs the encoded data through the reconfigured decoder.

The above-described decoding apparatus can be a software type that is operated through a program memory in an environment such as a PC or a hardware or firmware type that is based on a fixed chipset, such as STB/PVR/DVD-P, etc. In either case, the system in its pertinent environment can have the tool box 2250 in an adaptive tool library structure for reading the FU that is additionally transmitted from the outside and storing the read FU temporarily or permanently. In other words, the tool box 2250 can be an extra hard disk/memory space for storing and managing an outside FU in a software environment or can be realized by a separate storage medium, rewritable ROM or a changeable memory device, such as RAM, in a hardware environment.

Through this embodiment, the encoding side can receive the FU required for decoding the received data, and also can use and provide to the decoding side a non-standard FU and a user-defined customized FU.

Hitherto, FIGS. 22 to 25 have been referenced to describe an embodiment in which the FU is provided together with the encoded data in a broadcast environment, which has a one-way communication structure. Hereinafter, an encoding apparatus and a decoding apparatus in accordance with yet another embodiment of the present invention that provide FUs in two-way communication environment will be described.

Figure 26:
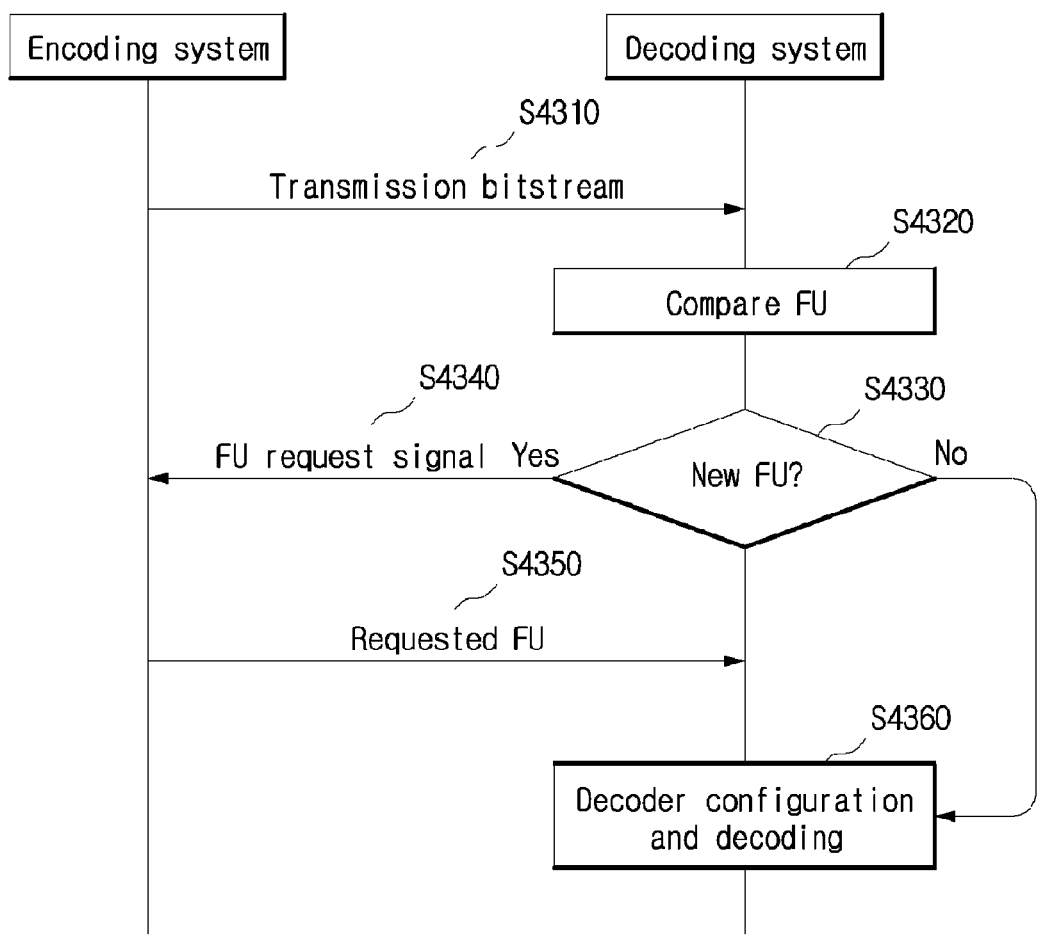
FIG. 26 is a conceptual illustration of how FU and encoded data are communicated in a two-way communication environment in accordance with yet another embodiment of the present invention.

FIG. 26 is a conceptual illustration of how FU and encoded data are communicated in a two-way communication environment in accordance with yet another embodiment of the present invention.

Referring to FIG. 26, the encoding system in accordance with yet another embodiment of the present invention transmits a transmission bitstream (S4310). The transmission bitstream includes encoded data, in which video, audio or multimedia data is encoded, decoder description of the encoded data and an FU list.

Then, a decoding system 4200 receives the transmission bitstream, separates and extracts the encoded data, decoder description and FU list from the transmission bitstream, and then compares the FU list with FUs stored in the tool box (S4320) to determine whether there is any new FU (S4330).

If it is determined that there is no new FU in the received FU list, the decoder is configured using the received decoder description and the FUs stored in the tool box, and the received encoded data is decoded (S4360).

On the other hand, if it is determined that there is a new FU in the received FU list, an FU request signal, which requests transmission of the new FU, is transmitted to the encoding system (S4340).

Then, the encoding system, which has received the FU request signal, transmits FU transmission data, which includes the requested FUs, in response to the received FU request signal (S4350), and the decoding system receives the FU transmission data, extracts the requested FUs and stores the requested FUs in the tool box, reconfigures the decoder using the received decoder description and the FUs stored in the tool box, and decodes the received encoded data (S4360).

The present embodiment can be applied to a transmission/reception-capable environment, such as IPTV. In such an environment, the receiver can request the transmission side for a particular FU to be transferred based on the received FU list.

Figure 27:
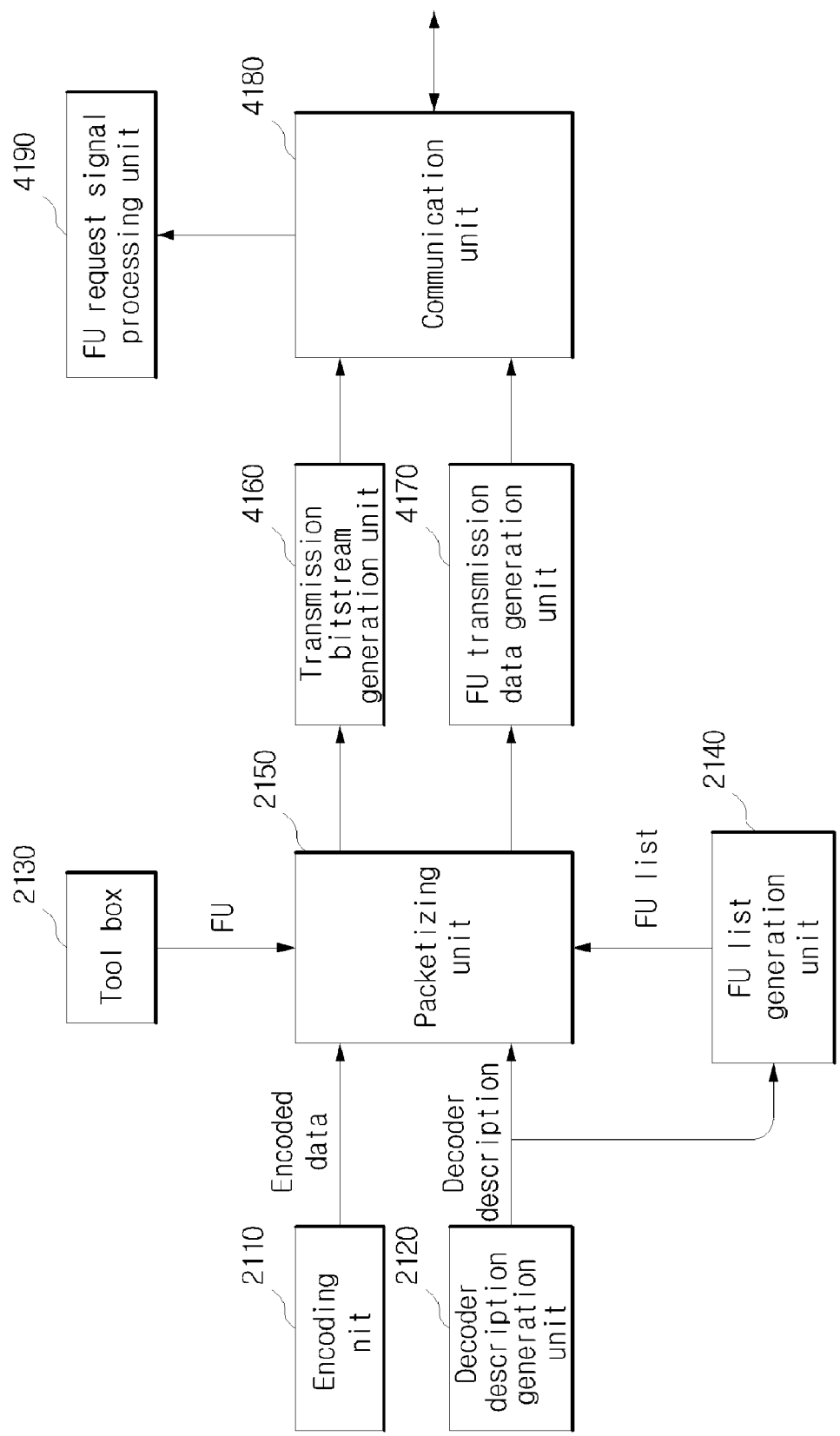
FIG. 27 illustrates the configuration of an embodiment of an encoding system shown in FIG. 26

FIG. 27 illustrates the configuration of an embodiment of the encoding system shown in FIG. 26

As illustrated in FIG. 27, the encoding system can be constituted by including a decoding unit 2110, a decoder description generation unit 2120, a tool box 2130, an FU list generation unit 2140, a packetizing unit 2150, a transmission bitstream generation unit 4160, an FU transmission data generation unit 4170, a communication unit 4180 and an FU request signal processing unit 4190.

Among the above elements of the present embodiment, the elements having the same name and reference numeral as the elements of the encoding apparatus described with reference to FIG. 22 are identical elements in their functions. Accordingly, the elements that are identical to the elements of FIG. 22 will not be redundantly described herein, and the functions of elements that are peculiar to the present embodiment will be mainly described hereinafter.

The packetizing unit 2150 is an element that packetizes inputted data by assigning a peculiar packet ID and outputs the packetized data, and its basic functions are identical to those of the packetizing unit 2150 described with reference to FIG. 22. However, its functions peculiar to the present embodiment are as follows. The packetizing unit 2150 packetizes the encoded data inputted from the encoding unit 2110, the decoder description inputted from the decoder description generation unit 2120 and the FU list inputted from the FU list generation unit 2140 by assigning their respective peculiar packet ID and outputs the packetized encoded data, decoder description and FU list to the transmission bitstream generation unit 4160. In addition, the packetizing unit 2150 packetizes the FUs inputted from the tool box and outputs the packetized FUs to the FU transmission data generation unit 4170. Here, while generating the FU list packet, the packetizing unit 2150 assigns a packet ID to each FU included in the FU list and includes the assigned packet ID in the FU list packet by matching the assigned packet ID with the FUID. While generating the FU packet, the packetizing unit 2150 assigns the packet ID, which is assigned while generating the FU list packet, to and packetizes the FU inputted from the tool box.

The transmission bitstream generation unit 4160 combines the packets inputted from the packetizing unit 2150 and generates and outputs the transmission bitstream. That is, the transmission bitstream generation unit 4160 is inputted with the encoded data packet, decoder description packet and FU list packet from the packetizing unit 2150, combines these packets, and generates and outputs the transmission bitstream. The transmission bitstream can include at least one of the combinations of the encoded data packet, decoder description packet and FU list packet.

The FU transmission data generation unit 4170 transforms the FU inputted from the packetizing unit to FU transmission data, which is a format for transmission through a wired/wireless communication network, and outputs the FU transmission data.

The communication unit 4180 is an element for communicating data with an outside communication network. Specifically, the communication network 4180 is inputted with and transmits the transmission bitstream or the FU transmission data, and outputs the received FU request signal to the FU request signal processing unit 4190.

The FU request signal processing unit 4190 analyzes the inputted FU request signal and allows the FU requested by the FU request signal to be outputted to the packetizing unit 2150 from the tool box 2130.

Figure 28:
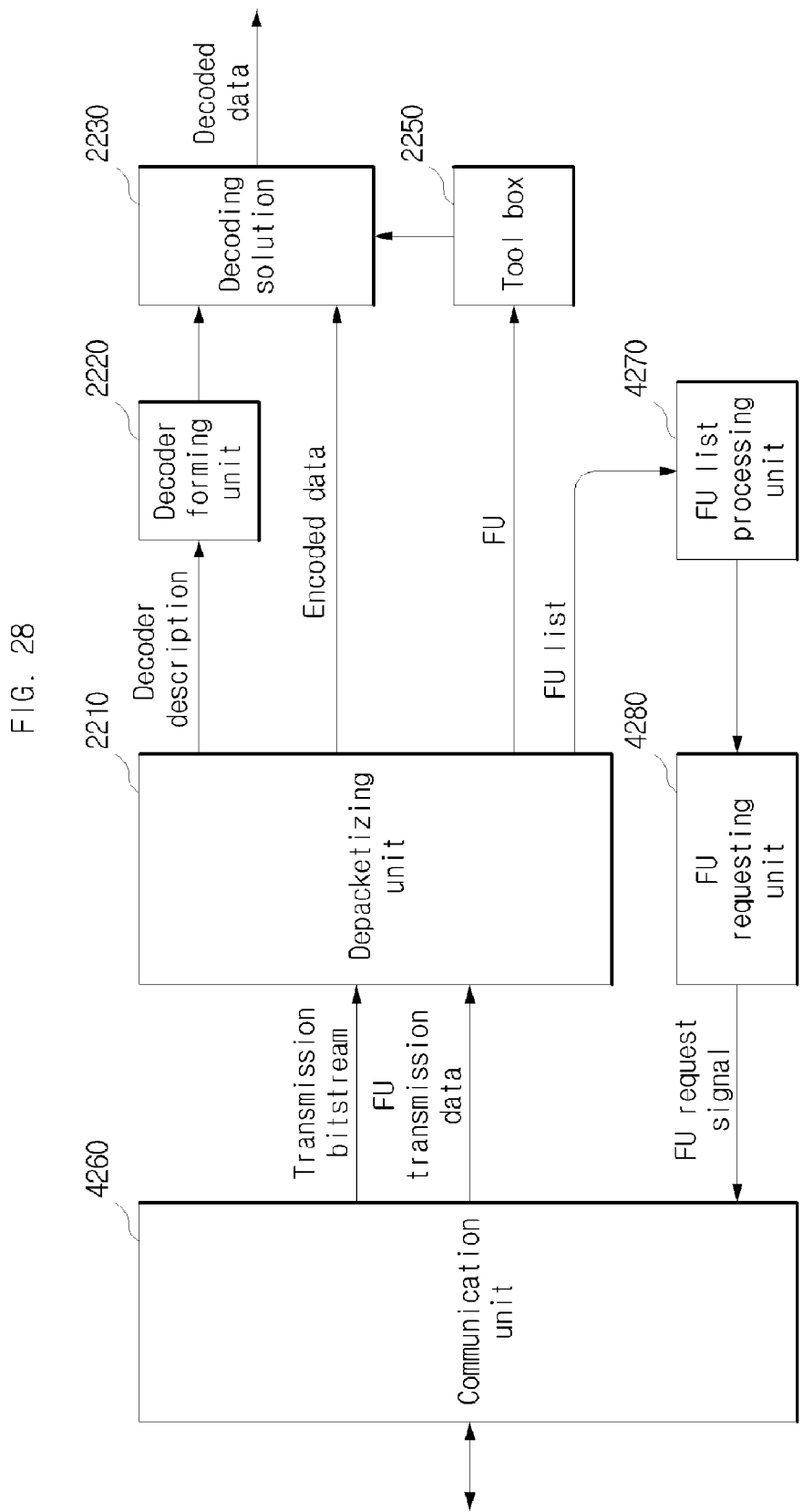
FIG. 28 illustrates the configuration of an embodiment of a decoding system shown in FIG. 26.

FIG. 28 illustrates the configuration of an embodiment of the decoding system shown in FIG. 26.

As illustrated in FIG. 28, the decoding system can be constituted by including a communication unit 4260, a depacketizing unit 2210, an FU list processing unit 4270, an FU requesting unit 4280, a decoder forming unit 2220, a decoding solution 2230 and a tool box 2250.

Among the above elements of the present embodiment, the elements having the same name and reference numeral as the elements of the decoding apparatus described with reference to FIG. 25 are identical elements in their functions. Accordingly, the elements that are identical to the elements of FIG. 25 will not be redundantly described herein, and the functions of elements that are peculiar to the present embodiment will be mainly described hereinafter.

The communication unit 4260 is an element for communicating data with an outside communication network. Specifically, the communication network 4260 receives and outputs the transmission bitstream or the FU transmission data through the communication network, and transmits the FU request signal to the pertinent encoding system.

The depacketizing unit 2210 is an element that separates and outputs the inputted data according to their packet types, and its basic functions are identical to those of the depacketizing unit 2210 described earlier with reference to FIG. 25. However, its functions peculiar to the present embodiment are as follows. The depacketizing unit 2210 separates, extracts and outputs the inputted transmission bitstream to the decoder description, encoded data and FU list using the packet ID. Here, the decoder description is inputted to the decoder forming unit 2220, and the encoded data is inputted to the decoding solution 2230 while the FU list is inputted to the FU list processing unit 4270. The depacketizing unit 2210 also separates FUs from the FU transmission data and outputs the separated FU to the tool box 2250. Here, the outputted FU is inputted to and stored in the tool box 2250.

The FU list processing unit 4270 compares the FUs stored in the tool box 2250 with the FUID included in the inputted FU list and determines whether any new FU is included in the FU list. If it is determined that a new FU is included in the FU list, the FU list processing unit 4270 outputs the FUID of the new FU to the FU requesting unit. If it is determined that no new FU is included in the FU list, the FU list processing unit 4270 allows the decoder forming unit 2220 and the decoding solution 2230 to start the decoding process.

The FU requesting unit 4280 generates the FU request signal using the inputted FUID and outputs the FU request signal to the communication unit 4260, allowing the communication unit 4260 to transmit the FU request signal to the pertinent encoding system.

Although some embodiments of the present invention have been described, it shall be appreciated that the present invention can be modified or permutated by a person of ordinary skill in the art to which the present invention pertains in a variety of ways without departing from the technical ideas and scope of the present invention that are disclosed in the appended claims below.

INDUSTRIAL APPLICABILITY

The present invention can be used in a video codec.

The invention claimed is:

1. An encoding apparatus comprising:
    an encoding unit configured to encode data and generate encoded data;
    a decoder description generation unit configured to generate a decoder description that describes functional units (FUs) constituting a decoder for decoding the encoded data and a connection relation of the FUs, the connection relation describing an output of one of the FUs as an input of another of the FUs;
    an FU list generation unit configured to generate and output an FU list for the FUs constituting a decoder for decoding the encoded data; and
    a packetizing unit configured to be input with the encoded data, be input with the decoder description, the FU list and FUs corresponding to the input encoded data, and packetize and output the decoder description, the FU list and the FUs,
    wherein the decoder description is used to load the FUs for decoding the encoded data to a decoding solution from a tool box,
    wherein the decoder description is decompressed to output a compact decoder description language (CDDL) decoder description classified into an FU networking table group including a virtual network table (VNT),
    wherein the FU networking table group includes a parameter table (PT),
    wherein the virtual network table (VNT) includes at least one input port field,
    wherein the parameter table (PT) includes a type table (TT) index field, and
    wherein the type index has a size of 8 bits if a type flag for the at least one input port is set as "1", and the type index is skipped if the type flag for the at least one input port is set as "0".

2. The encoding apparatus of claim 1, wherein the packetizing unit is configured to respectively assign a peculiar ID to and packetize the encoded data, the decoder description, the FU list and the FUs and generate an encoded data packet, a decoder description packet, an FU list packet and an FU packet.

3. The encoding apparatus of claim 2, further comprising a bitstream generation unit configured to generate a bitstream in which the encoded data packet, the decoder description packet, the FU list packet and the FU packet are combined.

4. The encoding apparatus of claim 2, wherein the FU list packet comprises FU identification (FUID) of the pertinent FUs and packet ID of the pertinent FU packets.

5. A decoding apparatus comprising:
a tool box configured to store a plurality of functional units (FUs);
a depacketizing unit configured to separate input bitstreams according to their packet types and output encoded data, a decoder description that describes FUs constituting a decoder for decoding the encoded data and a connection relation of the FUs, the connection relation describing an output of one of the FUs as an input of another of the FUs, an FU list and the FUs;
an FU comparing unit configured to be input with the FU list, extract an FUID of the FU list and compare the FUID of the FU list with an FUID of the FUs stored in the tool box to determine whether a new FU is in the FU list, and be input with a pertinent FU from the depacketizing unit if there is a new FU in the FU list and transfer the pertinent FU to the tool box to allow the tool box to store the new FU;
a decoder forming unit configured to analyze the decoder description, load FUs required for decoding the encoded data to the decoding solution from the tool box, and form a decoder by configuring the FUs; and
a decoding solution configured to be input with the encoded data and decode the encoded data through the formed decoder,
wherein the decoder description is decompressed to output a compact decoder description language (CDDL) decoder description classified into an FU networking table group including a virtual network table (VNT),
wherein the FU networking table group includes a parameter table (PT),
wherein the virtual network table (VNT) includes at least one input port field,
wherein the parameter table (PT) includes a type table (TT) index field, and
wherein the type index has a size of 8 bits if a type flag for the at least one input port is set as "1", and the type index is skipped if the type flag for the at least one input port is set as "0".

6. The decoding apparatus of claim 5, wherein the tool box comprises at least one of:
an MPEG video tool box configured to store FUs related to MPEG video decoding;
an MPEG audio tool box configured to store FUs related to MPEG audio decoding;
an MPEG graphics tool box configured to store FUs related to MPEG graphic decoding; and
a customized tool box configured to store customized FUs.

7. An encoding apparatus comprising:
a tool box configured to store a plurality of functional units (FUs);
an encoding unit configured to encode data and generate encoded data;
a decoder description generation unit configured to generate a decoder description that describes FUs constituting a decoder for decoding the encoded data and a connection relation of the FUs, the connection relation describing an output of one of the FUs as an input of another of the FUs;
an FU list generation unit configured to generate and output an FU list for the FUs constituting a decoder for decoding the encoded data;
a packetizing unit configured to be input with the encoded data, packetize and output the decoder description and an FU list corresponding to the input encoded data, and be input with the FUs and packetize and output the input FUs; and
an FU request signal processing unit configured to output from the tool box an FU corresponding to an FU request signal received from an outside and input the FU to the packetizing unit,
wherein the decoder description is used to load the FUs for decoding the encoded data to a decoding solution from a tool box, and
wherein the decoder description is decompressed to output a compact decoder description language (CDDL) decoder description classified into an FU networking table group including a virtual network table (VNT),
wherein the FU networking table group includes a parameter table (PT),
wherein the virtual network table (VNT) includes at least one input port field,
wherein the parameter table (PT) includes a type table (TT) index field, and
wherein the type index has a size of 8 bits if a type flag for the at least one input port is set as "1", and the type index is skipped if the type flag for the at least one input port is set as "0".

8. The encoding apparatus of claim 7, wherein the tool box comprises a plurality of tool boxes in which the FUs are stored by being classified according to their types, and
wherein the plurality of tool boxes comprises at least one of:
an MPEG video tool box configured to store FUs related to MPEG video decoding;
an MPEG audio tool box configured to store FUs related to MPEG audio decoding;
an MPEG graphics tool box configured to store FUs related to MPEG graphic decoding; and
a customized tool box configured to store customized FUs.

9. A decoding apparatus comprising:
a tool box configured to store a plurality of functional units (FUs);
a communication unit configured to communicate data with an outside encoding apparatus;
a depacketizing unit configured to separate data received from the communication unit according to their packet types and output encoded data, a decoder description that describes the FUs constituting a decoder for decoding the encoded data and a connection relation of the FUs, the connection relation describing an output of one of the FUs as an input of another of the FUs, an FU list and the FUs;
an FU list processing and FU requesting unit configured to compare the FU list with the FUs stored in the tool box to determine whether a new FU is in the FU list and generate an FU request signal requesting the new FU to the outside encoding apparatus if there is the new FU in the FU list;
a decoder forming unit configured to analyze the decoder description, load FUs required for decoding the encoded data to a decoding solution from the tool box, and form a reconfigured decoder by configuring the FUs; and
a decoding solution configured to be input with the encoded data and decode the encoded data through the formed reconfigured decoder,
wherein the decoder description is decompressed to output a compact decoder description language (CDDL) decoder description classified into an FU networking table group including a virtual network table (VNT), wherein the FU networking table group includes a parameter table (PT), wherein the virtual network table (VNT) includes at least one input port field, wherein the parameter table (PT) includes a type table (TT) index field, and wherein the type index has a size of 8 bits if a type flag for the at least one input port is set as "1", and the type index is skipped if the type flag for the at least one input port is set as "0".

10. The decoding apparatus of claim 9, wherein the depacketizing unit is configured to be input with a transmission bitstream and extract the encoded data, the decoder description and the FU list from the transmission bitstream.

11. The decoding apparatus of claim 9, wherein the depacketizing unit is configured to be input with FU transmission data, extract the FUs from the FU transmission data and store the extracted FUs in the tool box.

12. An encoding method comprising:
(a) generating encoded data by encoding data;
(b) generating a decoder description that describes functional units (FUs) constituting a decoder for decoding the encoded data and the connection relation of the FUs, the connection relation describing an output of one of the FUs as an input of another of the FUs;
(c) generating an FU list for FUs constituting a decoder for decoding the encoded data; and
(d) packetizing the encoded data and the decoder description, the FU list and FUs corresponding to the encoded data, wherein the decoder description is used to load the FUs for decoding the encoded data to a decoding solution from a tool box, wherein the decoder description is decompressed to output a compact decoder description language (CDDL) decoder description classified into an FU networking table group including a virtual network table (VNT), wherein the FU networking table group includes a parameter table (PT), wherein the virtual network table (VNT) includes at least one input port field, wherein the parameter table (PT) includes a type table (TT) index field, and wherein the type index has a size of 8 bits if a type flag for the at least one input port is set as "1", and the type index is skipped if the type flag for the at least one input port is set as "0".

13. A decoding method comprising:
separating input bitstreams according to their packet types and extracting encoded data, a decoder description that describes functional units (FUs) constituting a decoder for decoding the encoded data and a connection relation of the FUs, the connection relation describing an output of one of the FUs as an input of another of the FUs, an functional unit (FU) list and FUs;
extracting functional unit identification (FUID) of the FU list and comparing the FUID of the FU list with FUID of FUs stored in a tool box to determine whether a new FU is in the FU list;
transferring a pertinent FU to the tool box, if it is determined that there is a new FU in the FU list, to allow the tool box to store the new FU;
analyzing the decoder description and loading FUs required for decoding the encoded data from the tool box and forming a reconfigured decoder by configuring the FUs; and
decoding the encoded data through the formed reconfigured decoder, wherein the decoder description is decompressed to output a compact decoder description language (CDDL) decoder description classified into an FU networking table group including a virtual network table (VNT), wherein the FU networking table group includes a parameter table (PT), wherein the virtual network table (VNT) includes at least one input port field, wherein the parameter table (PT) includes a type table (TT) index field, and wherein the type index has a size of 8 bits if a type flag for the at least one input port is set as "1", and the type index is skipped if the type flag for the at least one input port is set as "0".

14. An encoding method comprising:
generating encoded data by encoding data;
generating a decoder description that describes FUs constituting a decoder for decoding the encoded data and a connection relation of the FUs, the connection relation describing an output of one of the FUs as an input of another of the FUs;
generating an FU list for FUs constituting a decoder for decoding the encoded data;
a packetizing unit configured to packetize the encoded data and the decoder description and an FU list corresponding to the encoded data and packetize input FUs; and
an FU request signal processing unit configured to output from a tool box an FU corresponding to an FU request signal received from an outside and input the FU to the packetizing unit, wherein the decoder description is used to load the FUs for decoding the encoded data to a decoding solution from a tool box, and wherein the decoder description is decompressed to output a compact decoder description language (CDDL) decoder description classified into an FU networking table group including a virtual network table (VNT), wherein the FU networking table group includes a parameter table (PT), wherein the virtual network table (VNT) includes at least one input port field, wherein the parameter table (PT) includes a type table (TT) index field, and wherein the type index has a size of 8 bits if a type flag for the at least one input port is set as "1", and the type index is skipped if the type flag for the at least one input port is set as "0".

15. A decoding method comprising:
receiving a transmission bitstream from an outside encoding apparatus;
separating the transmission bitstream according to packet types and extracting encoded data, a decoder description that describes functional units (FUs) constituting a decoder for decoding the encoded data and a connection relation of the FUs, the connection relation describing an output of one of the FUs as an input of another of the FUs and an FU list;
comparing the FU list with FUs stored in a tool box to determine whether a new FU is in the FU list;
generating and transmitting an FU request signal requesting the new FU to the outside encoding apparatus if it is determined that there is the new FU in the FU list;
receiving an FU transmission data from an outside encoding apparatus;

extracting FUs from the FU transmission data and storing the extracted FUs in the tool box;

analyzing the decoder description and loading FUs required for decoding the encoded data and forming a reconfigured decoder by configuring the FUs; and decoding the encoded data through the formed reconfigured decoder, wherein the decoder description is decompressed to output a compact decoder description language (CDDL) decoder description classified into an FU networking table group including a virtual network table (VNT), wherein the FU networking table group includes a parameter table (PT), wherein the virtual network table (VNT) includes at least one input port field, wherein the parameter table (PT) includes a type table (TT) index field, and wherein the type index has a size of 8 bits if a type flag for the at least one input port is set as "1", and the type index is skipped if the type flag for the at least one input port is set as "0".

* * * * *